United States Patent
Hande et al.

(10) Patent No.: US 11,349,764 B2
(45) Date of Patent: May 31, 2022

(54) METHODS AND APPARATUS FOR SIGNALING OFFSET IN A WIRELESS COMMUNICATION SYSTEM

(71) Applicant: QUALCOMM Incorporated, San Diego, CA (US)

(72) Inventors: Prashanth Haridas Hande, San Diego, CA (US); Rajat Prakash, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/562,263

(22) Filed: Sep. 5, 2019

(65) Prior Publication Data

US 2020/0267084 A1    Aug. 20, 2020

Related U.S. Application Data

(60) Provisional application No. 62/806,677, filed on Feb. 15, 2019.

(51) Int. Cl.
*H04W 28/02* (2009.01)
*H04L 47/2441* (2022.01)
(Continued)

(52) U.S. Cl.
CPC .......... *H04L 47/14* (2013.01); *H04L 47/2441* (2013.01); *H04L 47/283* (2013.01); *H04L 47/528* (2013.01); *H04W 72/087* (2013.01)

(58) Field of Classification Search
None
See application file for complete search history.

(56) References Cited

U.S. PATENT DOCUMENTS

| 6,317,435 B1 * | 11/2001 | Tiedemann, Jr. | ..... H04W 52/48 370/441 |
|---|---|---|---|
| 10,178,638 B1 | 1/2019 | Stamatakis et al. | |

(Continued)

OTHER PUBLICATIONS

"3rd Generation Partnership Project; Technical Specification Group Services and System Aspects; 5G enhanced mobile broadband; Media distribution (Release 16)", 3GPP Standard, Technical Specification, 3GPP TR 26.891, 3rd Generation Partnership Project (3GPP), Mobile Competence Centre, 650, Route Des Lucioles, F-06921 Sophia-Antipolis Cedex, France, vol. SA WG4, No. V16.0.0, Dec. 21, 2018 (Dec. 21, 2018), pp. 1-43, XP051591472, [retrieved on Dec. 21, 2018], paragraphs [0004], [04.6], [6.4.2].

(Continued)

*Primary Examiner* — Rebecca E Song
(74) *Attorney, Agent, or Firm* — Norton Rose Fulbright LLP

(57) ABSTRACT

Methods, systems, and devices for wireless communications are described. Some methods include receiving an indication of a traffic flow to be served by a wireless communication system, determining scheduling information for the traffic flow based on the indication, wherein the scheduling information comprises one or more of a time offset, a reliability, and a minimum throughput of delivery of data traffic for the flow, and transmitting the scheduling information in response to the indication. Some methods include determining delta time offset information relative to one or more existing time offsets of packet arrivals of one or more traffic flows for scheduling transmissions of a first traffic flow in the wireless communication system, and transmitting the delta time offset information to a node of the first traffic flow for scheduling transmissions of the first traffic flow in the wireless communication system. Other aspects and features are also claimed and described.

50 Claims, 18 Drawing Sheets

(51) Int. Cl.
  *H04W 72/08* (2009.01)
  *H04L 47/283* (2022.01)
  *H04L 47/52* (2022.01)

(56) References Cited

U.S. PATENT DOCUMENTS

| | | | |
|---|---|---|---|
| 2012/0170498 A1* | 7/2012 | Gustavsson | H04W 52/40 |
| | | | 370/350 |
| 2012/0327925 A1* | 12/2012 | Lee | H04W 74/04 |
| | | | 370/345 |
| 2013/0182643 A1 | 7/2013 | Pazos et al. | |
| 2014/0222962 A1 | 8/2014 | Mao et al. | |
| 2014/0229529 A1 | 8/2014 | Barone et al. | |
| 2014/0372624 A1 | 12/2014 | Wang et al. | |
| 2015/0381502 A1 | 12/2015 | Zhu et al. | |
| 2017/0295499 A1 | 10/2017 | Guo et al. | |
| 2018/0198871 A1 | 7/2018 | Walker et al. | |
| 2020/0259896 A1* | 8/2020 | Sachs | G07C 9/00174 |
| 2020/0366567 A1* | 11/2020 | Li | H04L 41/5003 |
| 2020/0367182 A1 | 11/2020 | Zou et al. | |
| 2021/0076407 A1 | 3/2021 | Joseph et al. | |
| 2021/0243641 A1* | 8/2021 | Gangakhedkar | H04L 47/28 |

OTHER PUBLICATIONS

"3rd Generation Partnership Project, Technical Specification Group Services and System Aspects, Study on Enhancement of 5GS for Vertical and LAN Services (Release 16)", 3GPP Standard, Technical Report, 3GPP TR 23.734, 3rd Generation Partnership Project (3GPP), Mobile Competence Centre, 650, Route Des Lucioles, F-06921 Sophia-Antipolis Cedex, France, No. V16.0.0, Dec. 19, 2018 (Dec. 19, 2018), pp. 1-107, XP051591220, [retrieved on Dec. 19, 2018] paragraph [6.18.].
International Search Report and Written Opinion—PCT/US2019/064275—ISA/EPO—dated Mar. 10, 2020.
Nokia, et al., "Summary of e-mail Discussion on TSN Traffic Patterns (with TP)", 3GPP Draft, R2-1900635_104#36NR IIOT-_TSN Trafficpatterns_Summary_and_TP, 3rd Generation Partnership Project (3GPP), Mobile Competence Centre, 650, Route Des Lucioles, F-06921 Sophia-Antipolis Cedex, vol. RAN WG2, No. Athens, Greece, Feb. 25, 2019-Mar. 1, 2019, Feb. 14, 2019 (Feb. 14, 2019), XP051602013, Retrieved from the Internet: URL: http://www.3gpp.org/ftp/tsg%5Fran/WG2%5FRL2/TSGR2%5F105/Docs/R2%2D1900635%2Ezip [retrieved on Feb. 14, 2019], paragraphs [02.1], [02.3], [06.5].
Nokia [RAN2]: "[Draft] LS on Assistance Information for TSN Traffic Flows", 3GPP Draft, 3GPP TSG-RAN WG2 Meeting #105, R2-1901714 Draft LS to SA2 on TSN traffic flows, 3rd Generation Partnership Project (3GPP), Mobile Competence Centre, 650, Route Des Lucioles, F-06921 Sophia-Antipolis Cedex, France, vol. RAN WG2. No. Athens. Greece, Feb. 25, 2019-Mar. 1, 2019, Feb. 14, 2019 (Feb. 14, 2019), XP051603064, 1 Page, Retrieved from the Internet: URL: http://www.3gpp.org/ftp/tsg%5Fran/WG2%5FRL2/TSGR2%5F105/Docs/R2%2D1901714%2Ezip [retrieved on Feb. 14, 2019], the whole document.
OPPO, et al., "Solution Update: Update to Solution 46", 3GPP Draft, SA WG2 Meeting #128bis, S2-187854 Ciot_Solution Update-Solution 46, 3rd Generation Partnership Project (3GPP), Mobile Competence Centre, 650, Route Des Lucioles, F-06921 Sophia-Antipolis Cedex, France, vol. SAWG2, No. Sophia-Antipolis, France, Aug. 20, 2018-Aug. 24, 2018, Aug. 14, 2018 (Aug. 14, 2018), XP051536813, 3 Pages, Retrieved from the Internet: URL: http://www.3gpp.org/ftp/tsg%5Fsa/WG2%5FArch/TSGS2%5F128BIS%5FSophia%5FAntipolis/Docs/S2%2D187854%2Ezip [retrieved on Aug. 14, 2018], paragraph [6.46.4].
Yuvraj S., et al., "Data-Aware Task Allocation for Achieving Low Latency in Collaborative Edge Computing", IEEE Internet of Things Journal, IEEE, USA, vol. 6, No. 2, Apr. 1, 2019 (Apr. 1, 2019), pp. 3512-3524, XP011723690, DOI: 10.1109/JIOT.2018.2886757 [retrieved on May 7, 2019] abstract section I section II: p. 2-p. 3; figure 1 section IV; p. 6-p. 7.

* cited by examiner

METHODS AND APPARATUS FOR SIGNALING OFFSET IN A WIRELESS COMMUNICATION SYSTEM

CROSS-REFERENCE TO RELATED APPLICATIONS

This application claims the benefit of U.S. Provisional Patent Application No. 62/806,677, entitled, "METHODS AND APPARATUS FOR SIGNALING OFFSET IN A WIRELESS COMMUNICATION SYSTEM," filed on Feb. 15, 2019, and is related to U.S. patent application Ser. No. 17/004,276, entitled "METHODS AND APPARATUS FOR SIGNALING OFFSET IN A WIRELESS COMMUNICATION SYSTEM," filed concurrently herewith, the disclosures of which are hereby incorporated by reference herein in their entirety as if fully set forth below and for all applicable purposes.

TECHNICAL FIELD

Certain aspects of the present disclosure generally relate to wireless communications and, more particularly, to techniques for signaling offset from a radio access network to multi-access edge servers and user applications.

INTRODUCTION

Wireless communications systems are widely deployed to provide various types of communication content such as voice, video, packet data, messaging, broadcast, and so on. These systems may be capable of supporting communication with multiple users by sharing available system resources (e.g., time, frequency, and power). Examples of such multiple-access systems include fourth generation (4G) systems such as LongTerm Evolution (LTE) systems, LTE-Advanced (LTE-A) systems, or LTE-A. Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may otherwise be known as user equipment (UE). Multi-Access Edge Servers (MEC) may also be deployed.

Resources such as power may become limited when there is a high demand for such resources. In some cases, there is a need to simultaneously support multiple devices competing for the same resources in a wireless communication system. In some cases, user requirements may involve complex computations resulting in slower processing, high power use and latency, Techniques for resource optimization in a wireless communication system are needed.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Techniques described below relate to improved methods, systems, devices, or apparatuses that support signaling offsets in a wireless communication system. Generally, some described techniques provide for receiving at a UB, an indication of a traffic flow to be served by a wireless communication system, receiving scheduling information for the traffic flow along with the indication, wherein the scheduling information comprises one or more of a time offset, a reliability, and a minimum throughput delivery of data traffic for the flow, and transmitting the scheduling information in response to the indication, to a higher layer, Described techniques provide for determining delta time offset information relative to one or more existing time offsets of packet arrivals of one or more traffic flows served by a wireless communication system for scheduling transmissions of a first traffic flow in the wireless communication system, and transmitting the delta time offset information to a node of the first traffic flow for scheduling transmissions of the first traffic flow in the wireless communication system.

In one aspect of the disclosure, a method for wireless communication is provided. The method of embodiments may include receiving an indication of a traffic flow to be served by a wireless communication system. The method of embodiments may further include determining time offset information for transmissions of the traffic flow based at least in part on the indication and transmitting the time offset information in response to the indication.

In an additional aspect of the disclosure, an apparatus configured for wireless communication is provided. The apparatus of embodiments may include means for receiving an indication of a traffic flow to be served by a wireless communication system. The apparatus of embodiments may further include means for determining time offset information for transmissions of the traffic flow based at least in part on the indication and means for transmitting the time offset information in response to the indication.

In an additional aspect of the disclosure, a non-transitory computer-readable medium having program code recorded thereon. The program code of embodiments may include code to receive an indication of a traffic flow to be served by a wireless communication system. The program code of embodiments may further include code to determine time offset information for transmissions of the traffic flow based at least in part on the indication and to transmit the time offset information in response to the indication.

In an additional aspect of the disclosure, an apparatus configured for wireless communication is provided. The apparatus includes at least one processor, and a memory coupled to the processor. The processor of embodiments may be configured to receive an indication of a traffic flow to be served by a wireless communication system. The processor of embodiments may further be configured to determine time offset information for transmissions of the traffic flow based at least in part on the indication and to transmit the time offset information in response to the indication.

In some examples of the methods, the apparatuses, and the articles including non-transitory computer-readable medium described herein, the time offset is based on a common clock shared between nodes communicating the traffic flow, wherein the time offset information comprises a time offset value relative to the common dock for scheduling traffic transmission of the traffic flow.

In some examples of the methods, the apparatuses, and the articles including non-transitory computer-readable medium described herein, an indication of the traffic flow comprises an indication of a new flow session establishment, and determining time offset information determines the time offset value of the time offset information for the traffic flow prior to establishing the new flow session.

In some examples of the methods, the apparatuses, and the articles including non-transitory computer-readable medium described herein, determining time offset information determines a plurality of time offset values for scheduling traffic transmission of the traffic flow, and transmitting the time offset information transmits the plurality of time offset values to an application entity in the wireless communication system.

In some examples of the methods, the apparatuses, and the articles including non-transitory computer-readable medium described herein, transmitting the time offset information includes signaling the time offset information to at least one application entity in the wireless communication system.

In some examples of the methods, the apparatuses, and the articles including non-transitory computer-readable medium described herein, the at least one application entity includes an Application Function (AF) on an edge server.

In some examples of the methods, the apparatuses, and the articles including non-transitory computer-readable medium described herein, the time offset information comprises a time offset for scheduling traffic originating from or destined to the edge server.

In some examples of the methods, the apparatuses, and the articles including non-transitory computer-readable medium described herein, include transmitting the time offset information between a Radio Access Network (RAN) and the AF in new fields of existing messages, new messages, or in reinterpreted fields of existing messages, wherein the time offset information is transmitted between the AF and a Policy Control Function (PCF), a Session Management Function (SMF) and the PCF, an Access and Mobility Management Function (AMF) and the SMF, or a Radio Access Network (RAN) and the AMF.

In some examples of the methods, the apparatuses, and the articles including non-transitory computer-readable medium described herein, include transmitting the time offset information in a notification message on a 3GPP interface between the AF and the PCF.

In some examples of the methods, the apparatuses, and the articles including non-transitory computer-readable medium described herein, include transmitting the time offset information in a notification message on a 3GPP interface between the RAN and the AMF.

In some examples of the methods, the apparatuses, and the articles including non-transitory computer-readable medium described herein, the at least one application entity includes an application on a user device.

In some examples of the methods, the apparatuses, and the articles including non-transitory computer-readable medium described herein, include transmitting the time offset information to the application on the user device via an operating system on the user device.

In some examples of the methods, the apparatuses, and the articles including non-transitory computer-readable medium described herein, the features described above may be combined in any combination.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
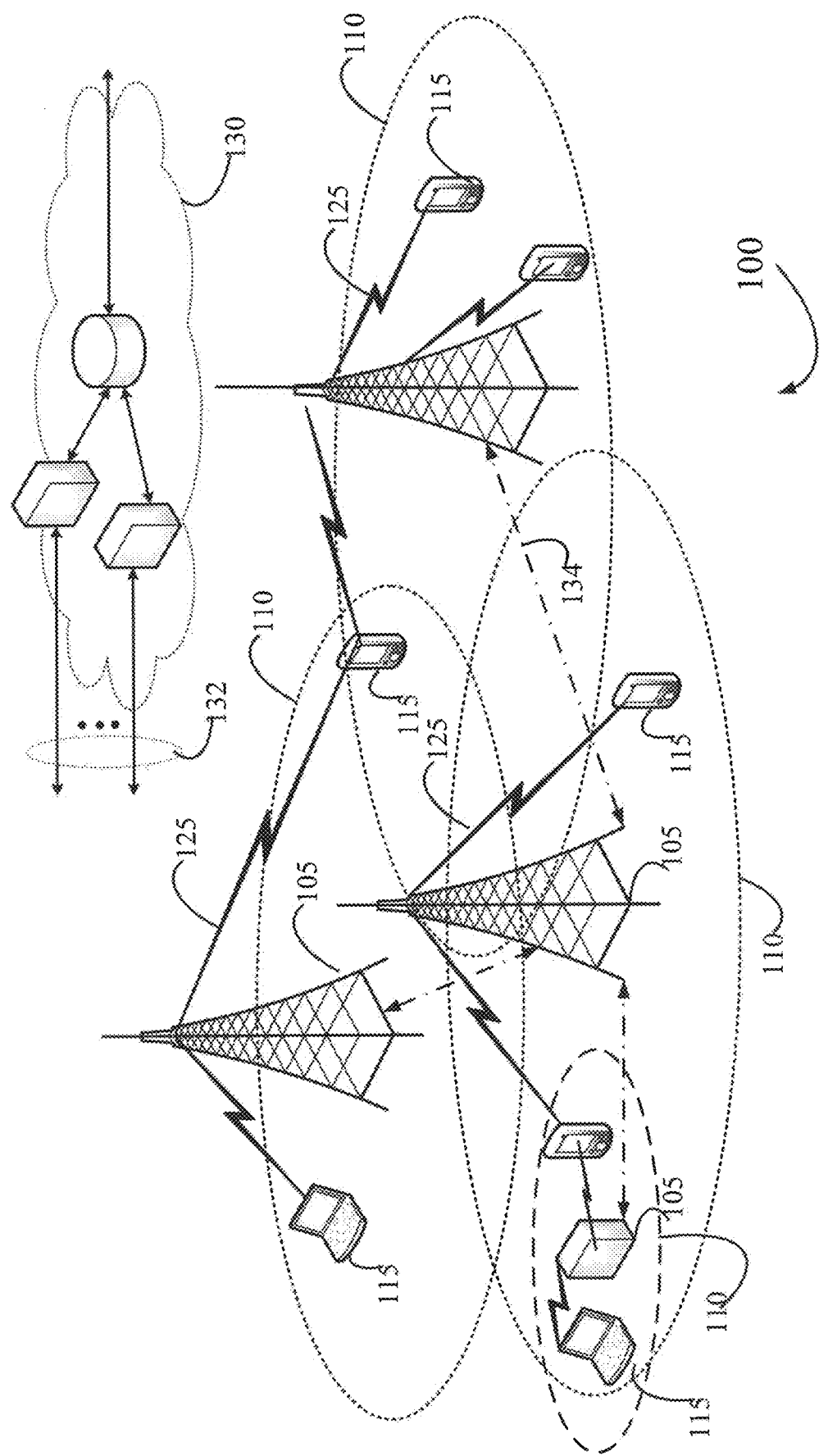
FIG. 1 illustrates an example wireless communication system that supports techniques for signaling offset in accordance with aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The availability of computation resources on a user equipment (UE) may become limited due to restrictions in form-factor, cost, power, etc. To better manage resources or increase system capacity, computations may be shared among devices and servers. In examples, computations may be shared between a device and a server (or multiple servers) One such server may be an edge server, such as a multi-access server (MEC). The UE and edge server may be connected to each other via a low latency transport link. The server may be located near the low-latency transport system to reduce latency. The server may additionally be coupled to one or more Data Networks (DN), such as may comprise local and/or central data networks, to facilitate the computations and/or other functions provided through server operation.

For example, virtual reality (VR) split rendering (VRSR) provides for offloading to a server, a portion of computations required to display an interactive virtual reality scene on a display device (e.g., UE providing display of VR content, such as through a head mounted display (HMD) connected thereto). Thus, instead of running a game engine on a display device, the game engine may be run on a server to free up resources on the display device. Splitting computations between user devices (e.g., display devices) and servers may relieve devices of unnecessary power and resource use while improving user experience. The server may be connected to a display device (e.g., HMD) via a transport system (e.g., 5G).

Disclosed examples provide techniques for improving communications in wireless communication systems, particularly, where user devices are simultaneously supported. The wireless communication system may comprise a 5G system, a plurality of user devices and one or more edge servers. In examples, techniques are provided for optimized traffic flow in a communication system. In examples, information may be signaled between a 5G system, edge servers, and/or user devices to improve system capacity. As used herein, capacity may refer to the number of user devices that may be simultaneously supported by the communication system.

In examples, techniques are provided for time synchronization (e.g., transmissions offset timing) between devices, e.g., between display devices, server(s) and parts of the communication system (e.g., 5G system) to improve system capacity. For example, in a VRSR system, techniques for time synchronization between display devices, a server and a 5G system may be employed to improve the number of virtual reality devices that may be simultaneously supported by the 5G system. Techniques for time synchronization according to aspects of the disclosure are not limited to application with respect to VR systems, and thus may additionally or alternatively be utilized with respect to various other systems such as augmented reality (AR) and extended reality (XR) for which time synchronization between devices may be utilized. Moreover, techniques in accordance with aspects herein may be utilized in applications in addition to or in the alternative to various hyperreality implementations (e.g., the aforementioned VR, AR, and XR), and thus may be utilized in various additional and/or alternative implementations (e.g., ultra-reliable and low-latency communication (URLLC)).

In some examples, an indication of a traffic flow to be served by a wireless communication system may be received, time offset information for transmissions of the traffic flow (e.g., a time offset for scheduling traffic originating from or destined to the edge server, such as to provide a desired packet arrival characteristic with respect to the traffic flow) determined based at least on part on the indication, and the time offset information may be transmitted in response to the indication. For example, a Radio Access Network (RAN) device (e.g., a base station, a gNB, a Central Unit (CU), a Distributed Unit (DU), etc.) or its components (e.g., a Session Management Function (SMF), a Policy Control Function (PCF), etc.) may receive the indication of the traffic flow, determine the time offset information, and transmit the time offset information to an Application Entity (AE) (e.g., an Application Function (AF) of an edge server and/or an application on a user device), such as for use in timing communication of packets of the traffic flow to avoid network congestion. In some examples, a UE may receive an indication of traffic flow to be served by a wireless communication system, receive time offset information for transmissions of the traffic flow, and transmit the time offset information in response to the indication to a higher layer (e.g., an application on the UF), such as for use in timing communication of packets of the traffic flow to avoid network congestion. In some aspects, a RAN device may also receive time offset information (e.g., Time Sensitive Communication Assistance Information (TSCAI)) from a node or function in the core network.

In some examples, a change in time offset value determined relative to a current packet arrival offset (also referred to herein as a delta time offset) for a new or existing traffic flow may be determined relative to a time offset of packet arrivals of the traffic flow. For example, a first node (e.g., a User Plane Function (UPF), a Session Management Function (SMF), a Policy Control Function (PCF), a RAN device, a base station, a gNB, a Central Unit (CU), a Distributed Unit (DU), etc.) may determine time offsets of packet arrivals of a traffic flow in a second node (e.g., a gNB, cell, DU, etc.), determine a delta time offset for the traffic flow relative to a time offset of the time offsets, and indicate to a third node (e.g., AE, AF of an edge server, user device, application on a user device, etc.) the delta time offset. The delta time offset may be utilized, for example, in timing transmission of packets of the traffic flow so as to avoid network congestion.

Aspects of the disclosure are initially described in the context of a wireless communications system. Aspects of the disclosure are further illustrated by a process flow. Aspects of the disclosure are further illustrated by and described with reference to apparatus diagrams, system diagrams, and flowcharts that relate to techniques signaling offset from a wireless communication system to a server.

FIG. 1 illustrates an example of a system 100 for wireless communications in accordance with various aspects of the present disclosure. The system 100 includes base stations 105, UEs 115, and a core network 130. In some examples, the system 100 may be a Long Term Evolution (LTE) network, an LTE-Advanced (LTE-A) network, an LTE-A Pro network, or a New Radio (NR) network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area. 110 in which communications with various UEs 115 is supported. Each base station 105 may provide communication coverage for a respective geographic coverage area 110 via communication links 125. Communication links 125 between a base station 105 and a UE 115 may utilize one or more carriers. Communication links 125 shown in the system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

A geographic coverage area 110 for a base station 105 may be divided into sectors making up only a portion of the geographic coverage area 110. Each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110.

In some examples, different geographic coverage areas 110 associated with different technologies may overlap, and overlapping geographic coverage areas 110 associated with different technologies may be supported by the same base station 105 or by different base stations 105, The system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention.

In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW).

Figure 2:
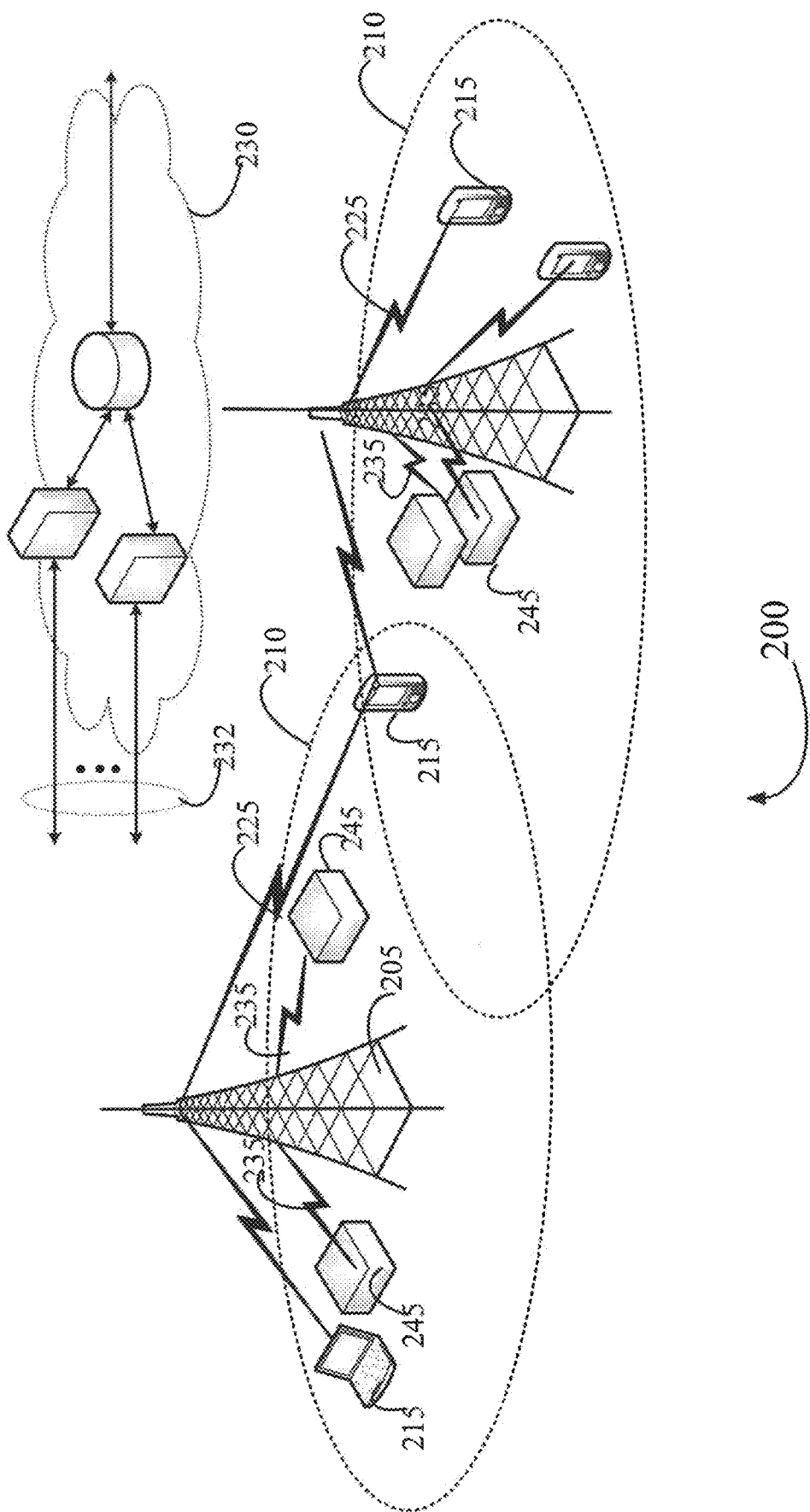
FIG. 2 illustrates an example of a wireless communication system 200 that supports techniques for signaling offset in accordance with aspects of the present disclosure.

FIG. 2 illustrates an example of a wireless communication system 200 for wireless communications in accordance with various aspects of the present disclosure. The system 200 includes base stations 205, UEs 215, a core network 230 and edge server systems 245 (e.g., multi-edge computing (MEC) systems). One or more of base stations 205 may correspond to base stations 105 of FIG. 1, one or more of UEs 215 may correspond to UEs 115 of FIG. 1, and/or core network 230 may correspond to core network 130 of FIG. 1 in accordance with some aspects of the present disclosure. In some examples, the system 200 may be an LTE network, an LTE-A network, an LTE-A Pro network, an NR or 5G network. In some cases, the system 200 may support enhanced broadband communications, ultra-reliable communications, low latency communications, or communications with low-cost and low complexity devices.

Base stations 205 may be associated with particular coverage areas 210 in which communications with various UEs 215 and edge servers 245 is supported. Each base station 205 may communicate with UEs 215 via communication link 225. Each base station may communicate with edge server or edge server 245 via communication link 235, Communication links 235 shown in the system may include uplink transmissions from an edge server 245 to a base station 205, or downlink transmissions from a base station 205 to an edge server 245. Edge server 245 may be located close to or integrated with base station 205. In examples, mobile users 215 may reduce cost and power by offloading latency driven or computation intensive tasks (e.g., various VR, AR, XR, etc. processing involving appreciable processing resource utilization) to edge servers 245 located near the network edge. Processing closer to a UE 215 results in improved application performance and a reduction in network congestion.

5G (NR) networks are positioned to manage traffic more efficiently by integrating edge server 245. In examples, the transport layer between user devices 215 and edge server 245 may be a RAN such as a 5G base station. In examples, the ultra-reliable and low-latency communication (URLLC) feature of 5G provides a low-latency transport system between the edge server 245 and the user devices 215. This transport layer between user device 215 and an edge server 245 may transmit the output of computations from an edge server 245 to UE 215.

In certain scenarios, network congestion increases when edge server 245 computations for multiple user devices 215 are transmitted in overlapping timeframes. Thus, a time offset may be introduced in a wireless communication system to reduce or prevent overlap and ultimately de-congest communication networks. As used herein, time offset may refer to a pre-determined time offset value or a change in time offset value determined relative to a current packet arrival offset, or delta time offset, for traffic transmissions between a user device 115 and edge server 245.

Figure 3:
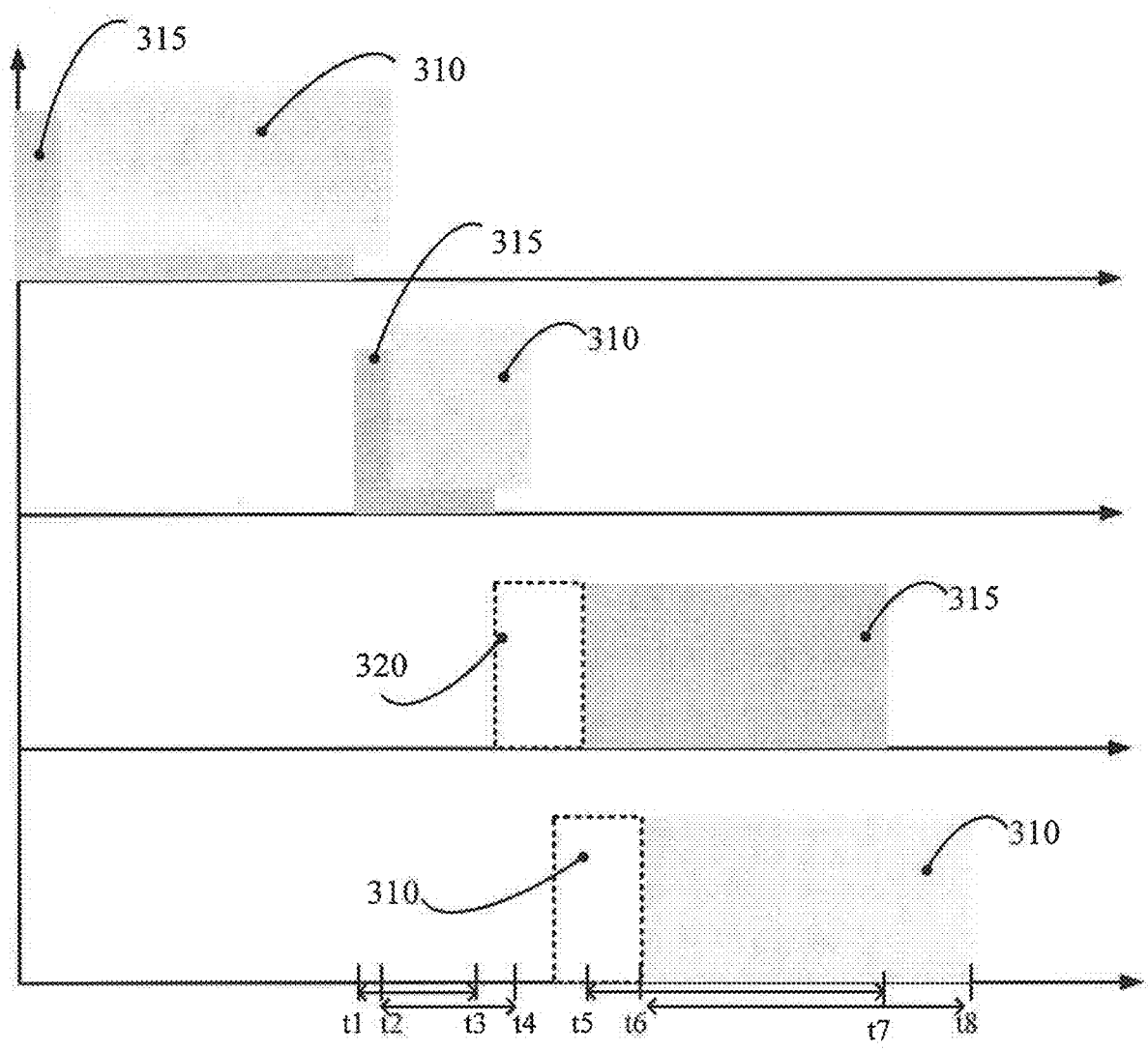
FIG. 3 illustrates an example timeline in accordance with aspects of the present disclosure.

This is explained further with reference to FIG. 3. As illustrated in FIG. 3, computations corresponding to a first device 315 may be completed on an edge server at a time H. In order to reduce latency experienced by a user, it may be desirable to transmit the output of edge server computations as soon as this information is available. The output of the edge server 245 may be transmitted on an exemplary 5G system 205 to user device 215. Assume 5G transport time is the time taken to transport the output of computations for user devices 315, and 310. Thus, 5G transport time for device 315 may be the time calculated from t1 to t3 (or time at t3-time at t1). edge server 245 may complete computations for a second device 310 at time t2. Similarly, the 5G transport time for device 310 may be calculated as the time between t2 and t4 (or time t4-t2).

As illustrated in FIG. 3, timeframe t3-t1 and t4-t2 overlap during timeframe t2-t3. Thus, in timeframe t2-t3, and in similar scenarios with even more users, the wireless communication system (e.g., the 5G transport system) may experience congestion and it may be necessary to make provisions for more spectrum resources on the 5G system.

Similarly, the start and end transmission times for computations on different devices communicating with an edge server 245 may be un-coordinated. For instance, in FIG. 3, device 315 computation time (after buffer time 320) may be calculated as t7-t5 and device 310 computation time (after buffer time 321) may be calculated as t8-t6. As shown, there may be overlap in traffic transmission from device 315 and 310 during timeframe t7-t6, causing network congestion. In other words, an exemplary 5G system may try to transmit traffic from different devices 215 to the edge server 245 server on the uplink within overlapping timeframes and this would also result in network congestion.

In examples, edge servers 245 may share the same 5G system as transport. If the edge servers 245 fail to communicate with each other (e.g., where servers are owned/deployed by different entities), then the traffic associated with different edge servers 245 may be un-coordinated, and transmission times may overlap.

In exemplary scenarios, transmission time overlap results in congestion and the need for 5G systems to be provisioned with more spectrum resources to handle traffic requirements. In some examples, it may be determined to deploy fewer edge servers 245. In some examples, it may become necessary to simultaneously support fewer user devices 215 with given spectrum resources resulting in reduced network capacity.

The present disclosure provides for optimized resource usage in such scenarios and techniques to increase system capacity. In examples, techniques are provided for signaling offset in a communication systems. In accordance with aspects of the present disclosure, systems and methods provide for signaling time offsets from 5G systems to edge servers and user applications. The time offsets may, for example, comprise pre-determined time offset information (e.g., a start time value based upon a common clock shared between nodes of a traffic flow) and/or delta time offset information relative to packet arrivals of one or more existing traffic flows (e.g., determined without reference to a common clock shared between nodes of a traffic flow).

In examples, transmission times associated with different edge server 245 and user devices 215 may be coordinated such that traffic transmission is staggered on the RAN (e.g., on the 5G transport system). In some examples, time offsets may be predetermined by a scheduler in a RAN. In aspects, a time offset may be determined by a radio access component. In aspects, a time offset may be determined by a 5G system. In aspects, time offsets may be determined based on a common or shared clock. In some examples, time offsets may be determined by one or more nodes in a traffic flow based upon packet arrivals of existing traffic flows. In aspects, a delta time offset for a new or existing traffic flow may be determined relative to a time offset of packet arrivals of one or more existing traffic flows. In aspects, delta time offsets may be determined without reference to a common or shared clock. In examples, time offset information e.g., time offsets, delta time offsets, etc.) may be dynamically determined based on traffic requirements.

Figure 4:
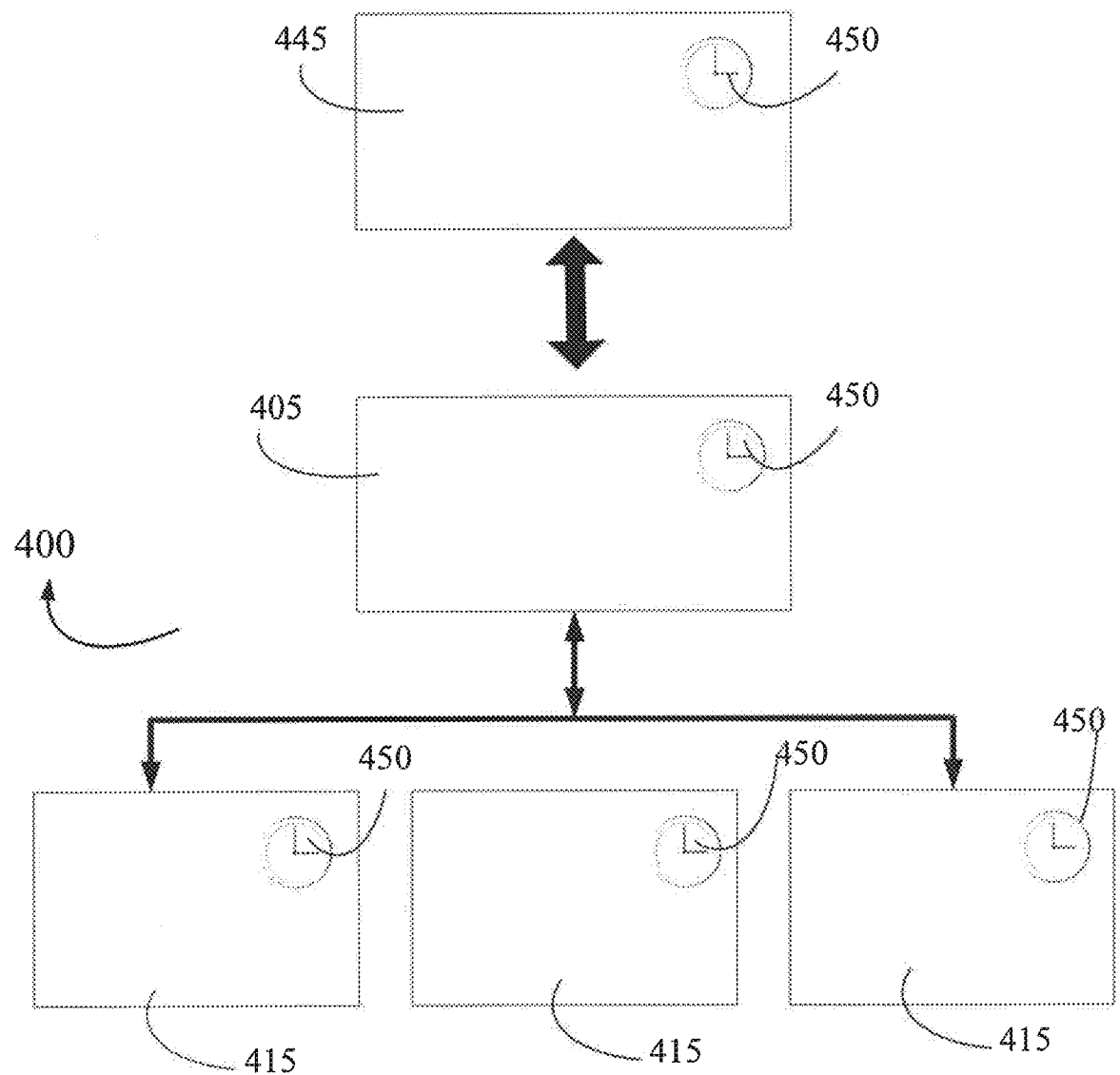
FIG. 4 illustrates an example block diagram in accordance with various aspects of the present disclosure.

FIG. 4 illustrates an example block diagram that supports techniques for signaling time offsets in a wireless communication system in accordance with aspects of the present disclosure. In some examples, the block diagram may implement aspects of the wireless communication system 100 and 200. Base station 405, edge server 445 and UE 415 may be examples of the corresponding devices described with reference to FIGS. 1 and 2.

In some examples, systems and methods that leverage a common clock in a wireless communication system may be provided to optimize system resources and reduce system latency. For example, in FIG. 4, a common clock 450 may be configured between edge server 445, RAN system or device such as a 5G system 405 and user devices 415. A common clock as used herein may also be referred to as a shared clock and may be a clock that is synchronized to a common time (e.g., when connected to a common time standard or source such as an atomic clock). In some examples, common clock 450 may be an automatically set clock.

In some examples, edge server 445, 5G system 405 and the user devices 415 may all acquire a global clock such as GPS time, via GPS units attached to each device.

In some examples, the edge server 445 may maintain a "local" clock, which may be transferred to the 5G system 405 and user devices 415.

In some examples, the 5G system 405 may provide the 5G system 405 clock to the edge server 445 and the user devices 415, where the 5G clock is a clock on which symbols, slots, sub-frames, radio-frames of the 5G system are defined.

In some examples, common clock 450 may be utilized in determining time offset information for a traffic flow to be served by a wireless communication system. In other examples, common clock 450 may be omitted or otherwise remain unutilized (e.g., not referenced) in determining time offset information for a traffic flow to be served by a wireless communication system.

Figure 5A:
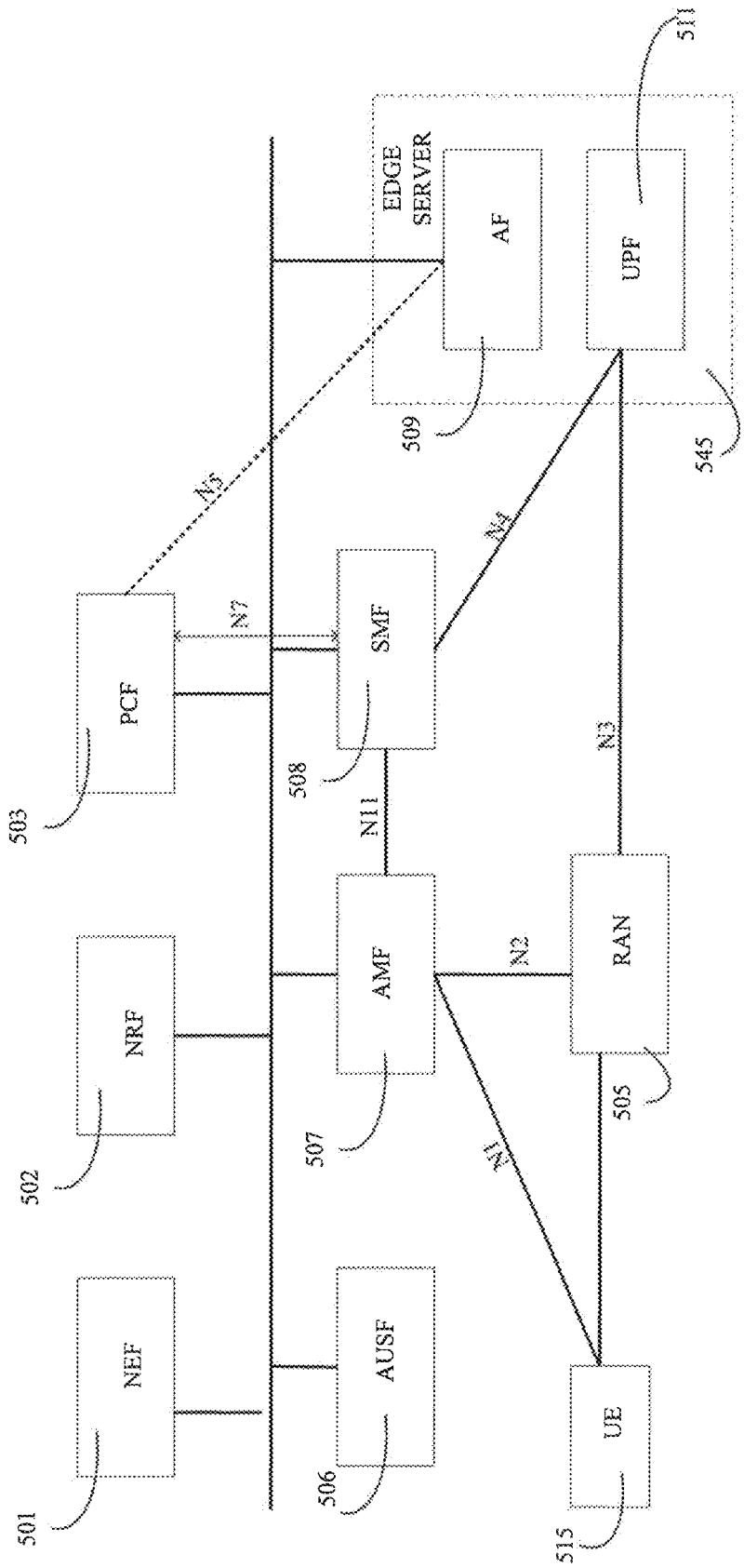
FIGS. 5A and 5B illustrate an example radio access network and edge server that supports techniques for signaling offset in accordance with aspects of the present disclosure.

FIG. 5A illustrates an example 5G and edge server architecture. The 5G service-based architecture (as specified in 3GPP TS 23.501) contains several control plane functional entities including a Policy Control. Function (PCF) 503, Session Management Function (SMF) 508, Application Function (AF) 509, Access and Mobility Management Function (AMF) 507, Authentication Server Function (AUSF) 506, etc. User Plane Function (UPF) 511 is a data plane functional entity. The user plane carries user traffic and the control plane carries signaling in the network. A UE 515 is connected to a RAN as well as AMF 507. The Network Exposure Function (NEF) may be used as the entry point in the 5G network for authorized third parties. Using NEF, users may configure how appropriate application traffic in the user plane is directed towards edge server applications, NEF may also be used for exposing network information such as radio resource element, mobility, etc., to the edge server system. In other words, the NEF may handle control plane functions for third party service providers to manage edge server operations.

In the example of FIG. 5A, UE 515 connects to AMF 507 which provides UE-based authentication, authorization, mobility management, registration management, UE mobility event notification, security context management etc. The 3GPP interface between. AMF 507 and UE 515 is referred to as N1. SMF 508 is responsible for session management and allocates IP addresses to UEs 515. SMF 508 also controls and selects the UPF for data transfer. The 3GPP interface between AMF and SMF is referred to as N11 and the 3GPP interface between RAN 505 and AMF 507 is referred to as N2. Exemplary AF 509 may provide information on packet flow to PCF 503. PCF 503 is responsible for policy control and determines policies about mobility and session management. The 3GPP interface between the SMF 508 and PCF 503 is referred to as N7, and the 3GPP interface between the AF and PCF is referred to as N5. AUSF 506 stores data for authentication of UE 515.

In some examples, a scheduler at the RAN of a 5G system may have knowledge of traffic demands on a 5G system including traffic from edge server 545 to different user devices 515 on the downlink and from different user devices 515 to edge server 545 on the uplink. In aspects, a scheduler may receive an indication of traffic flow to be served by a wireless communication system for instance, an SMF may indicate to RAN, via AMF, a new Quality of Service (QoS) flow as part of protocol data unit (PDU) session establishment. Time offset information for transmissions of the traffic flow (e.g., a time offset for scheduling traffic originating from or destined to the edge server, such as to provide a desired packet arrival characteristic with respect to the traffic flow) may be determined based at least on part on the indication, and the time offset information may be transmitted by the RAN in response to the indication.

Scheduling information determined by a scheduler may comprise one or more of a reliability requirement for traffic data, a minimum throughput of delivery of data traffic for traffic flow, one or more of a time offset based on a common or shared clock, etc. In examples, if traffic between edge server 545 and UEs 515 is periodic, transmission times for traffic between edge server 545 and user-devices 515 may be offset on the 5G system to reduce transmission overlap. In aspects, time offset(s) may be signaled to suggest start times at which corresponding traffic is least likely to face an overlapping transmission.

In examples, time offsets may be signaled to an application entity (AE) in a wireless communication system (e.g., for use by the AE and/or for providing to the DN). An application entity may refer to an application function (AF) of an edge server 545 or an application on a user-device 515. An application function may be implemented as a network element on dedicated hardware or as a software instance running on hardware or as a virtualized function instantiated on a corresponding platform such as a cloud infrastructure.

In examples, if the AE is an AF on an edge server, the time offset information (e.g., one or more pre-determined time offset value, delta time offset value, etc.) may be sent from the RAN to the AF associated with the edge server via the AMF, SMF and PCF. For instance, as illustrated in FIG. 5A, time offset information may be transmitted from RAN 505 to AF 509 via AMF 507, SMF 508, and PCF 503. This transmission path of the time offset information from the RAN to the AF is shown schematically in FIG. 5B as the dotted line of transmission path 581 from RAN 505 to AF 509 via AMF 507, SMF 508, and PCF/NEF 501/503. The time offset information may, for example, be transmitted via transmission path 581 in new fields (e.g., one or more fields defined for transmission of time offset information in accordance with aspects herein) of existing messages, new messages (e.g., one or more messages defined for transmission of time offset information in accordance with aspects herein), or in reinterpreted fields of existing messages (e.g., pre-existing message fields reinterpreted for transmission of time offset information in accordance with aspects herein).

Figure 5B:
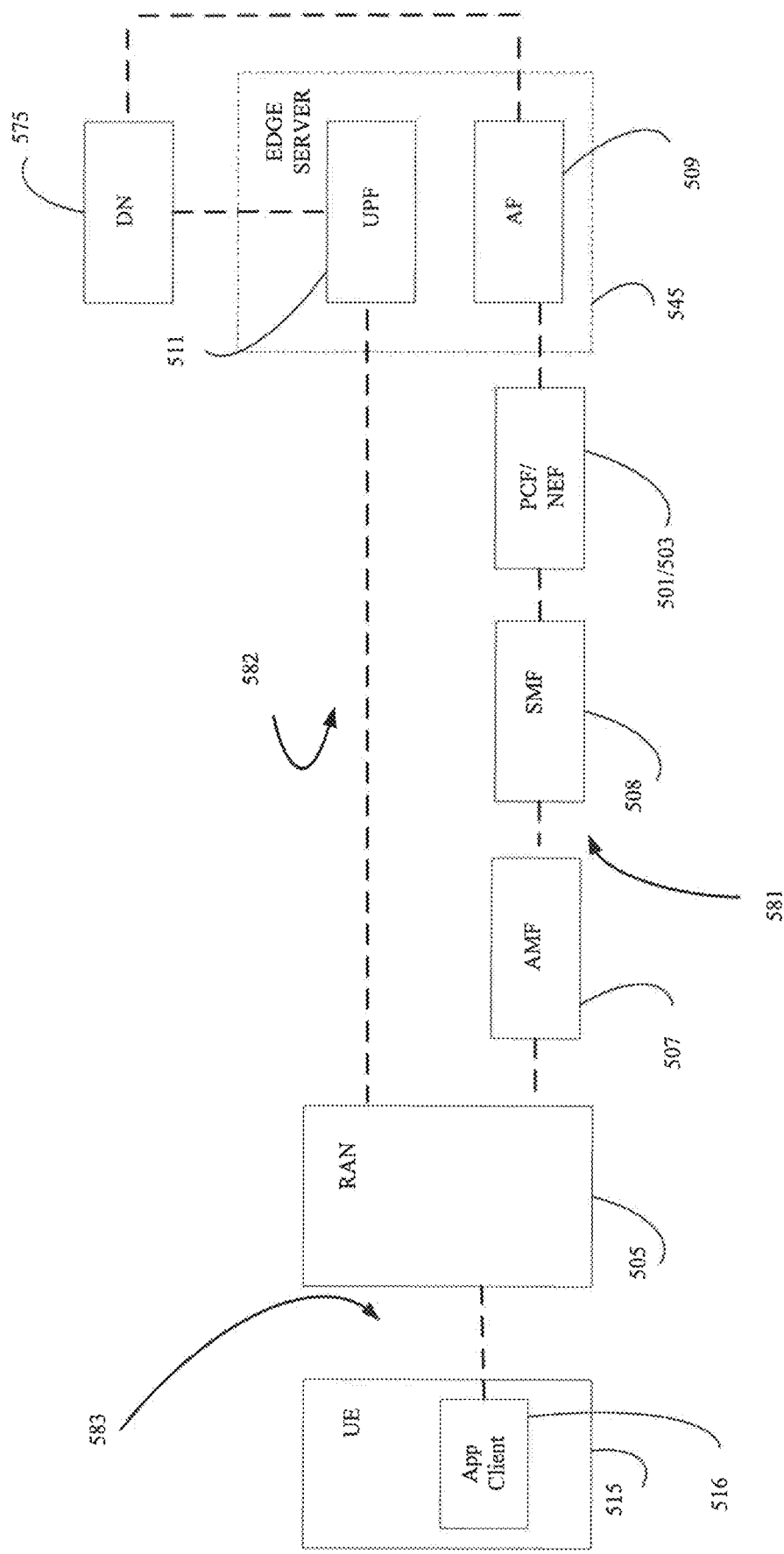

Transmission paths for transmission of time offset information from the RAN may be provided in addition to or in the alternative to that of the example above. In examples, of transmission of time offset information from the RAN to an AE that is an AF on an edge server, the time offset information (e.g., one or more pre-determined time offset value, delta time offset value, etc.) may be sent from the RAN to the AF associated with the edge server via the UPF and a DN, For instance, as illustrated in FIG. 5B, time offset information may be transmitted from RAN 505 to AF 509 via UPF 511 and DN 575, as shown by the dotted line of transmission path 582 in FIG. 5B. In examples, of transmission of time offset information from the RAN to a DN that is in communication with an AE that is an AF on an edge server, the time offset information may be sent from the RAN to the DN via the UPF (e.g., using an interface for control information) and/or from the RAN to the DN via the UPF, DN, AF, and DN (e.g., using a server network interface between the edge server and DN). For instance, as illustrated in FIG. 5B, time offset information may be transmitted from RAN 505 to DN 575 via UPF 511 and/or from RAN 505 to DN 575 via. UPF 511, DN 575, and AF 509 (e.g., where the time offset information is carried in a data packet directed to the AF), as shown by the dotted line of transmission path 582 in FIG. 5B. The time offset information may, for example, be transmitted via transmission path 582 in a data packet (e.g., IP data packet) of the UPF, such as using new messages (e.g., one or more messages defined for transmission of time offset information in accordance with aspects herein) and/or new interfaces (e.g., AF message interface defined for transmission of time offset information in accordance with aspects herein).

If the AE is an application on the UE, the offset information may additionally or alternatively be sent from the RAN to a UE 515 which conveys the offset information to an application on UE 515 either directly or indirectly via an operating system (OS) on the device. Accordingly, in some examples, if the AE is an application on the user device, the time offset information (e.g., one or more start time value, delta time offset value, etc.) may be sent from the RAN to the application on the user device via the user device. For instance, as illustrated in FIG. 5B, time offset information may be transmitted from RAN 505 to application client 516 via UE 515. This transmission path of the time offset information from the RAN to the application client is shown schematically in FIG. 5B as the dotted line of transmission path 583 from RAN 505 to application client 516 via UE 515 (e.g., UE 515 conveying the offset information to application client 516 on UE 515 either directly or indirectly via an operating system (OS) on the device). The time offset information may, for example, be transmitted via transmission path 583 in new fields (e.g., one or more fields defined for transmission of time offset information in accordance with aspects herein) of existing messages, new messages (e.g., one or more messages defined for transmission of time offset information in accordance with aspects herein), or in reinterpreted fields of existing messages (e.g., pre-existing message fields reinterpreted for transmission of time offset information in accordance with aspects herein).

In examples, a UE may receive an indication of traffic flow to be served in a wireless communication system. In examples, the SMF may, via the AMF, indicate a new QoS flow to a UE. This may be as part of PDU session establishment. The UE may receive scheduling information for the traffic flow, along with the received indication. The scheduling information received by the UE may comprise one or more of a reliability, a minimum throughput of delivery of data traffic for the traffic flow, time offset information, etc. In aspects, in response to the received indication, the UE may provide the scheduling information to a higher layer (e.g., Higher Layer Operating System (HLOS) to media codec, such as gini bu media codec) to allow the higher layer to adjust the frames to minimize the delay experienced by a user.

The time offset information conveyed to the AF associated with the server may correspond to traffic originating at the server (downlink traffic), or to traffic destined to the server (uplink traffic). In the latter case, it is up to the server and device to exchange information that will allow the traffic destined to the server to arrive at the 5G system at the time indicated by the offset.

The time offset information may be in response to a session establishment request from the AE. Additionally or alternatively, the time offset information may be in response to determining a preferred characteristic of packet arrival for an existing flow.

In some examples, the 5G system (e.g., RAN) may indicate multiple time offset values to the AE, and the AE may select one time offset value among the multiple time offset values. In examples, if none of the offset values indicated by the 5G system is acceptable to the AE, the AB may suggest alternative values, and the 5G system may determine if any of the suggested values are acceptable, allowing negotiation of the offset values between the 5G system and AE.

In examples, assuming the AE is an AF on an edge server, on the interfaces (e.g., N2, N5, N7, N11) between the RAN and the AF, the time offset information may be carried in new fields of existing messages, or in new messages, or by reinterpretation of existing fields in existing messages.

On an N5 3GPP interface (i.e., between the AF and PCF), the time offset information may be carried or transmitted in a notification message. In examples, such a notification message may be indicative of data flow (e.g., of data flow quality of service). Such notification may be used by an AF to receive notifications regarding quality of service targets. In some examples, such a message may comprise a QosNotificationControlInfo data structure type, and time offset information may be carried as part of this message (e.g., as part of Npcf_PolicyAuthorization_Notify service).

On an N2 3GPP interface (i.e., between the RAN and AMF) the time offset information may be carried or transmitted in a notification message. In examples, such a notification message may be indicative of or correlated to an established quality of service flow or packet data unit (PDU) session(s) for a UE. In examples, the offset value may be carried or transmitted in a PD SESSION RESOURCE NOTIFY message.

In examples, assuming the AE is an AF on an edge server, on the interface (e.g., UPF interface) between the RAN and the AF, the time offset information may be carried in new messages.

In examples, assuming the AE is an application on the user-device, on each of the interfaces between the RAN and the application on the device, the offset values may be carried in new fields of existing messages, or in new messages, or by reinterpretation of existing fields in existing messages.

Figure 6:
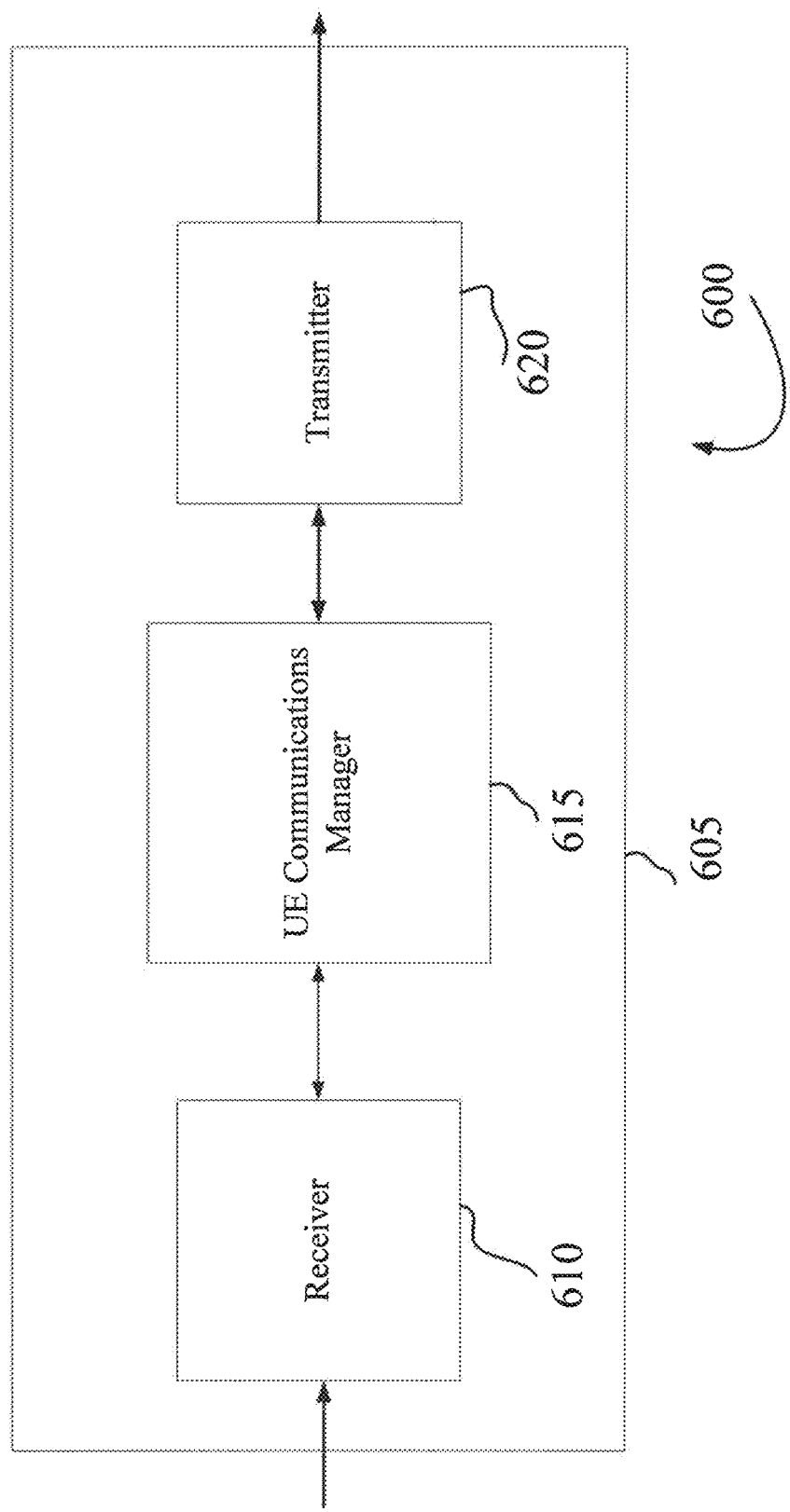
FIG. 6 illustrates a block diagram of a system including a LTE that supports techniques for signaling offset in accordance with aspects of the present disclosure.

FIG. 6 illustrates an example block diagram that supports techniques for signaling time offset in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information, time offset information, a plurality of time offsets, time offset values, delta time offset values, etc. Received information may be passed on to other components of the device. The receiver 610 may be an example of aspects of the transceiver 835 described with reference to FIG. 8. The receiver 610 may utilize a single antenna or a set of antennas.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive an indication of traffic flow to be served in a wireless communication system, receive scheduling information for the traffic flow along with the indication. UE communications manager 615 may additionally or alternatively receive scheduling information for an existing traffic flow. The scheduling information may include time offset information, a plurality of time offsets, time offset values, delta time offset values, etc.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Transmitter 620 may transmit the scheduling information in response to the indication, to a higher layer. For example, transmitter 620 may transmit time offset information of the scheduling information to an application on the UE.

Figure 7:
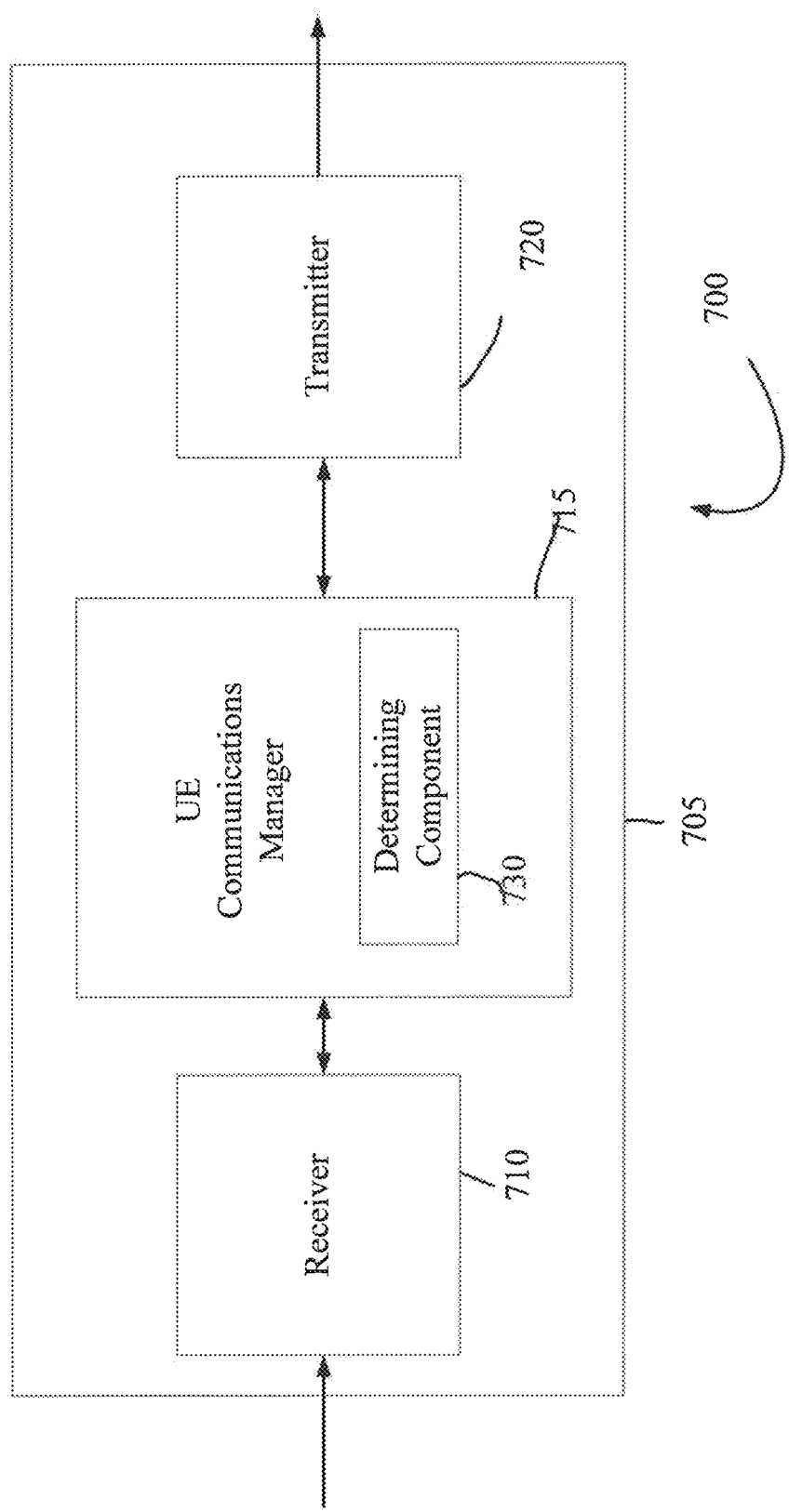
FIG. 7 illustrates a block diagram of a system including a UE that supports techniques signaling time offset in accordance with aspects of the present disclosure.

FIG. 7 shows a block diagram 700 of a wireless device 705 that supports techniques for signaling time offset in accordance with aspects of the present disclosure. Wireless device 705 may be an example of aspects of a wireless device 605 and/or a UE 115 as described with reference to FIG. 6 or FIG. 1. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information, time offset information, a plurality of time offsets, time offset values, delta time offset values, an indication of traffic flow, scheduling information etc. Received information may be passed on to other components of the device. The receiver 710 may be an example of aspects of the transceiver 835 described with reference to FIG. 8. The receiver 710 may utilize a single antenna or a set of antennas.

UE communications manager 715 may be an example of aspects of the UE communications manager 615 described with reference to FIG. 6. UE communications manager 715 may also include determining component 730.

Determining component 730 may determine a time offset value or one time offset value from a plurality of time offset values.

Transmitter 720 may transmit signals generated by other components of the device. In some examples, the transmitter 720 may be collocated with a receiver 710 in a transceiver module. For example, the transmitter 720 may be an example of aspects of the transceiver 835 described with reference to FIG. 8. The transmitter 720 may utilize a single antenna or a set of antennas.

Figure 8:
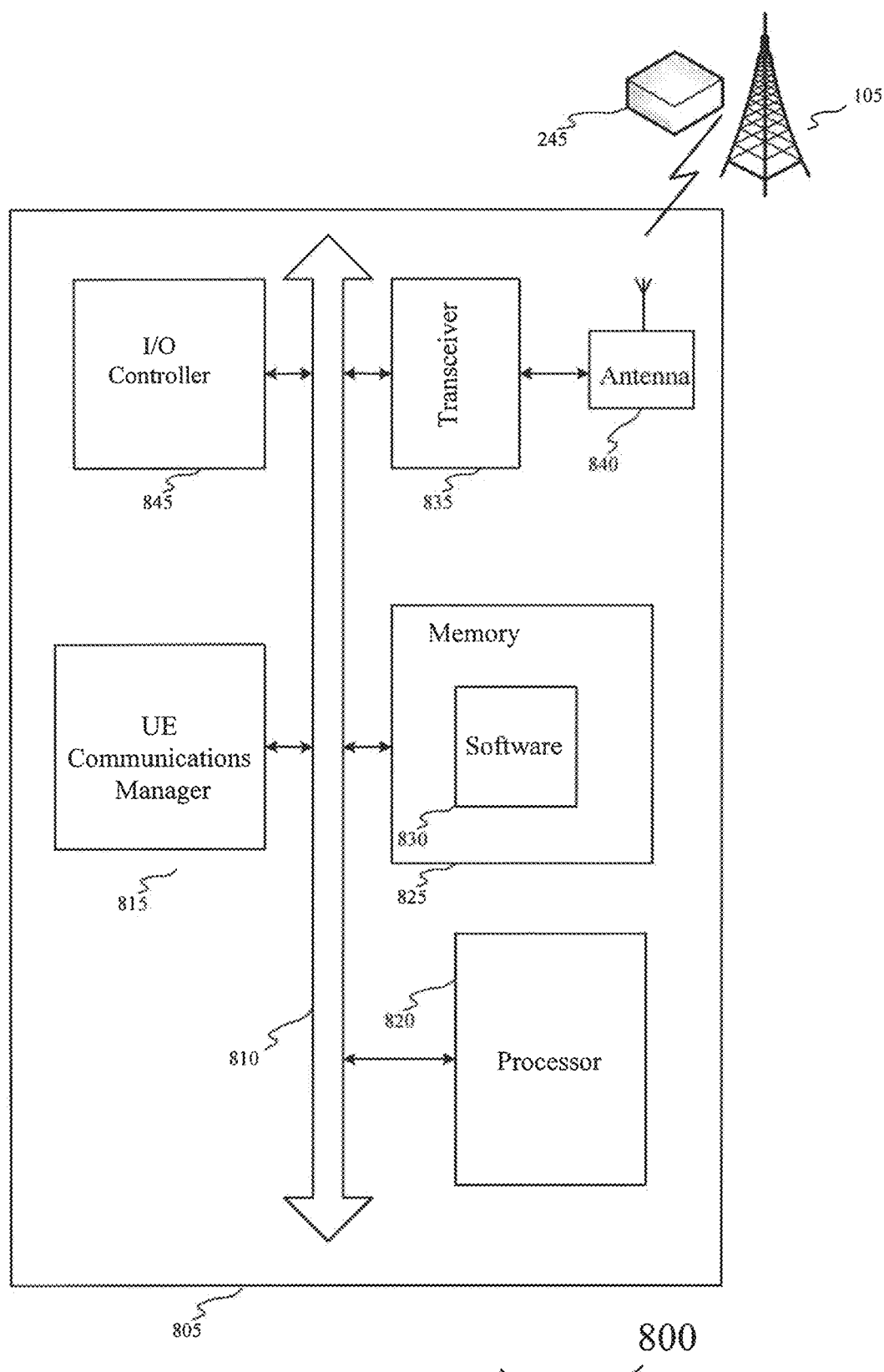
FIG. 8 illustrates a block diagram of a system including a UE, and edge server device and a base station that supports techniques for signaling offset in accordance with aspects of the present disclosure.

FIG. 8 shows a system including a UE, and edge server device and a base station that supports techniques for signaling offset in accordance with aspects of the present disclosure. Device 805 may be an example of or include the components of wireless device 605, wireless device 705, and/or a UE 115 as described above (e.g., with reference to FIGS. 6 and 7). Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting network aided power saving techniques).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support determining signaling offsets, communication of time offset information, etc. in a wireless communication system. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
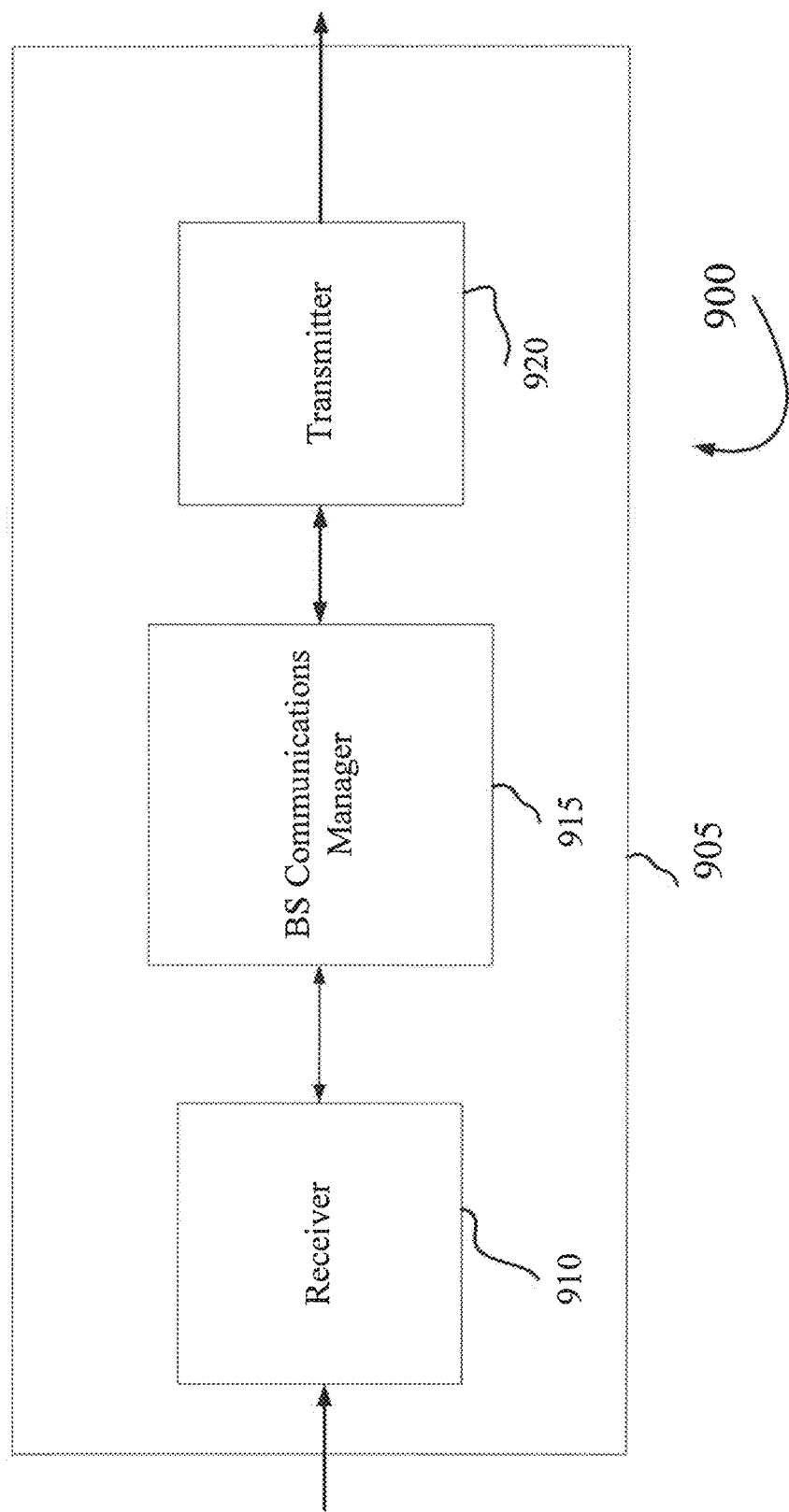
FIG. 9 illustrates a block diagram of a wireless device that supports techniques for signaling offset in accordance with aspects of the present disclosure.

FIG. 9 shows a block diagram 900 of a wireless device 905 that supports techniques for signaling time offset in accordance with aspects of the present disclosure. Wireless device 905 may be an example of aspects of a base station 105 and/or 205 as described with reference to FIG. 1 or FIG. 2, etc. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, throughput indicators, control information, clock information, timing information, indication of traffic flow, etc. associated with various information channels or users in a wireless communication system. Information may be passed on to other components of the device. The receiver 910 may be an example of aspects of the transceiver 1135 described with reference to FIG. 11. The receiver 910 may utilize a single antenna or a set of antennas.

Receiver 910 may receive information such as packets, user data, throughput indicators, control information, clock information, timing information, indication of traffic flow, etc.

Base station communications manager 915 may be an example of aspects of the base station communications manager 1015 described with reference to FIG. 10. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may receive clock information, timing information, traffic information, indication of traffic flow etc., from a device or other devices in a communication system.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas. Transmitter 920 may transmit a message such as scheduling information in accordance with received information.

Figure 10:
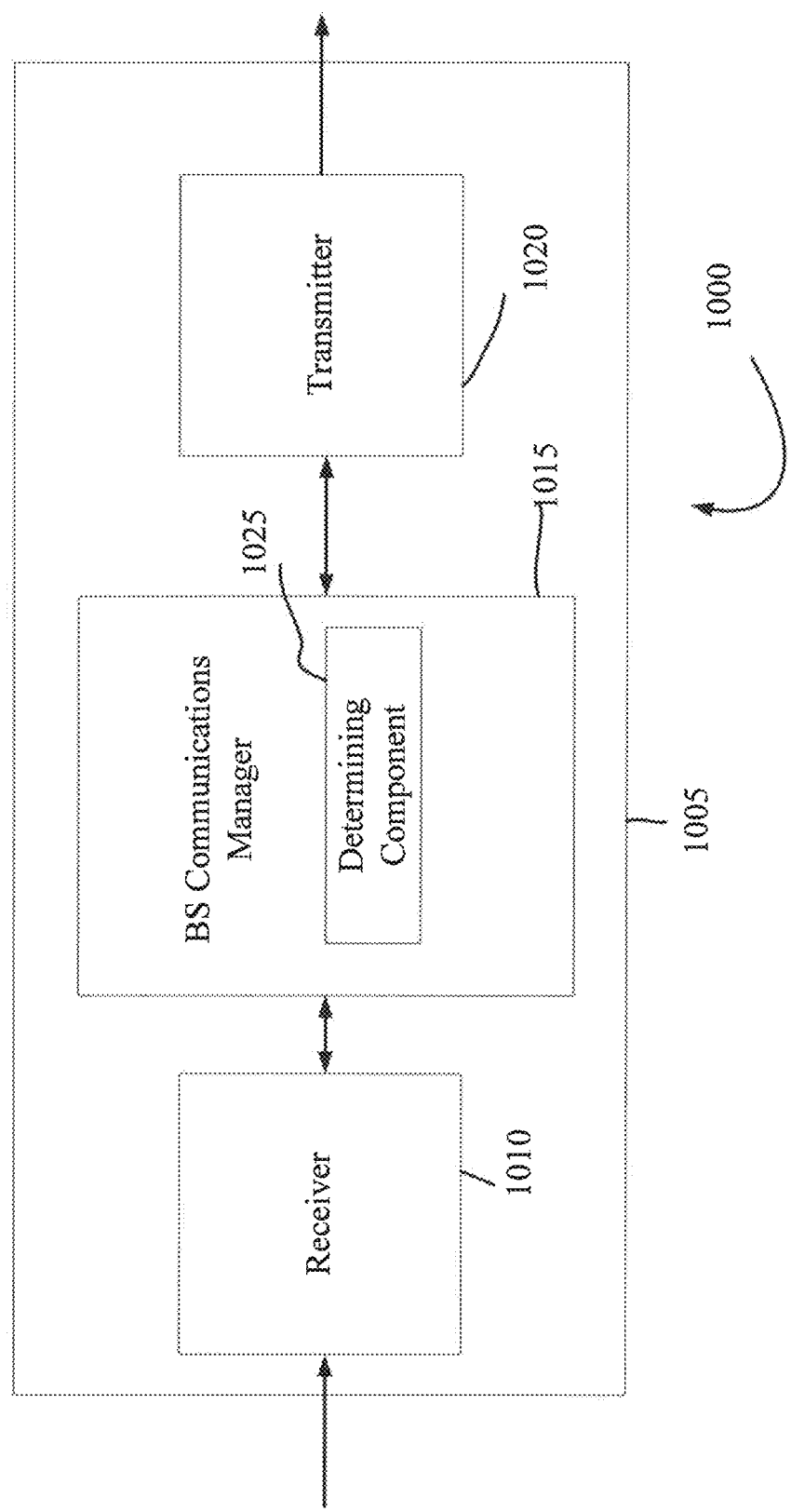
FIG. 10 illustrates a block diagram of a wireless device that supports techniques for signaling offset in accordance with aspects of the present disclosure.

FIG. 10 shows a block diagram 1000 of a wireless device 1005 that supports techniques for signaling time offset in accordance with aspects of the present disclosure. Wireless device 1005 may be an example of aspects of a wireless device 905 or a base station 105 as described with reference to FIG. 9 and FIG. 1, respectively. Wireless device 1005 may include receiver 1010, base station communications manager 1015, and transmitter 1020. Wireless device 1005 may also include a processor. Each of these components may be in communication with one another (e.g., via one or more buses).

BS communications manager 1015 and/or at least some of its various sub-components may be implemented in hardware, software executed by a processor, firmware, or any combination thereof. If implemented in software executed by a processor, the functions of the BS communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The BS communications manager 1015 and/or at least some of its various sub-components may be physically located at various positions, including being distributed such that portions of functions are implemented at different physical locations by one or more physical devices. In some examples, BS communications manager 1015 and/or at least some of its various sub-components may be a separate and distinct component in accordance with various aspects of the present disclosure. In other examples, BS communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

BS communications manager 1015 may determine time offsets, time offset information, time offset values, delta time offset values, etc. BS communications manager 1015 may include determining component 1025. Determining component 1025 may determine base station algorithms (e.g., scheduling algorithms to adjust or change based on received information).

Transmitter 1020 may transmit signals generated by other components of the device. In some examples, the transmitter 1020 may be collocated with a receiver 1010 in a transceiver module. The transmitter 1020 may utilize a single antenna or a set of antennas. Transmitter 1020 may transmit to a receiving device in accordance with received timing or traffic information.

Figure 11:
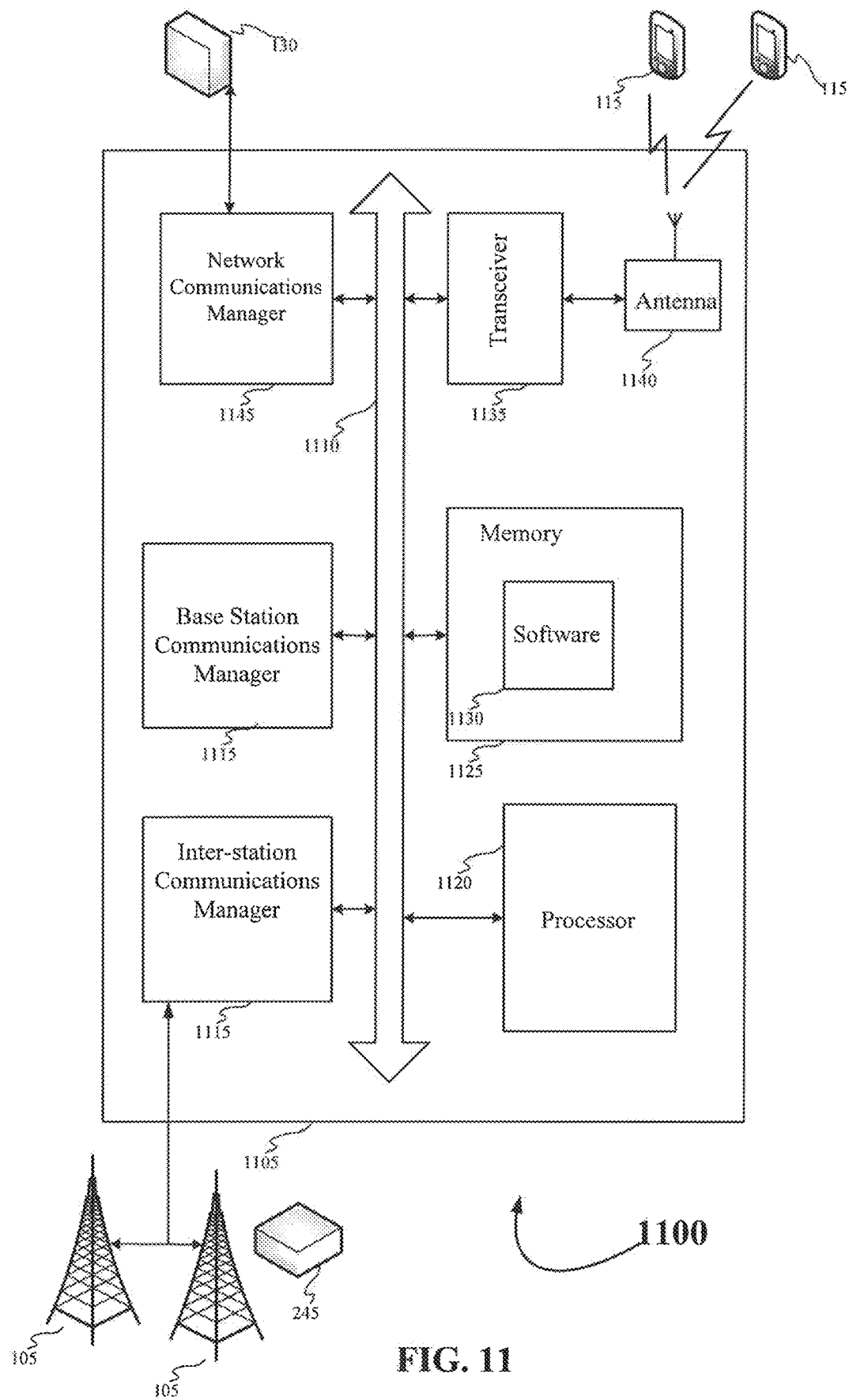
FIG. 11 illustrates a system including a UE, edge server, and a base station that supports techniques for signaling offset in accordance with aspects of the present disclosure.

FIG. 11 shows a system 1100 including a device 1105 that supports techniques for signaling timing offset in accordance with aspects of the present disclosure. Device 1105 may be an example of or include the components of wireless device 905, wireless device 1005, and/or a UE 115 as described above (e.g., with reference to FIGS. 9 and 10). Device 1105 may include components for bi-directional voice and data communications including components for transmitting and receiving communications, including base station communications manager 1115, processor 1120, memory 1125, software 1130, transceiver 1135, antenna 1140, and Network Communications Manager 1145. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting network aided power saving techniques).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support determining scheduling information (e.g., including time offset information), communicating scheduling information, etc. in a wireless communication system. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas In some cases, the wireless device may include a single antenna 1140. However, in some cases the device may have more than one antenna 1140, which may be capable of concurrently transmitting or receiving multiple wireless transmissions.

The network communications manager 1145 may manage communications with the core network (e.g., via one or more wired backhaul links). For example, the network communications manager 1145 may manage the transfer of data communications for client devices, such as one or more UEs 115.

The edge server 245 may transmit communications to device 1105 via RAN device 105.

Figure 12A:
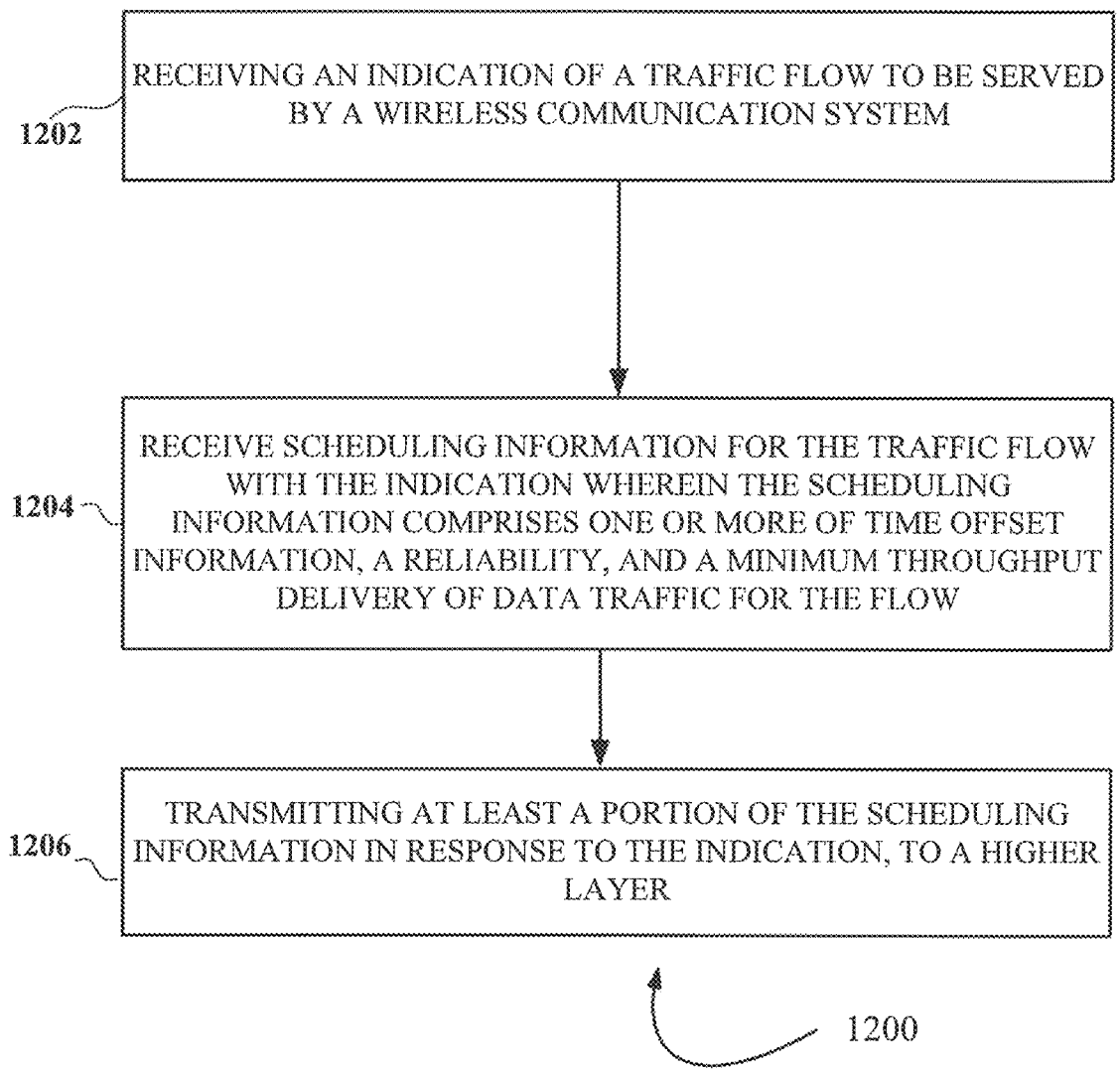
FIGS. 12A and 12B illustrate methods at a UE for signaling offset in accordance with aspects of the present disclosure.

FIG. 12A shows a flowchart illustrating a method 1200 that supports techniques for signaling time offsets in accordance with aspects of the present disclosure. The operations of method 1200 may be implemented by a UE 115 or its components as described herein. For example, the operations of method 1200 may be performed by a UE communications manager as described with reference to FIGS. 6 and 7. In some examples, a UE 115 may execute a set of codes to control the functional elements of the device to perform the functions described below.

At 1202 the UE 115 may receive an indication of a traffic flow to be served by a wireless communication system. The operations of 1202 may be performed according to the methods described herein. For example, an application on the UE may initiate a request via an operating system of UE 115 to establish a session (e.g., a session establishment request) with an AF of an edge server, wherein an indication of a traffic flow for the session is provided by the RAN to the UE in response to the session establishment request. As another example, an AF of an edge server may initiate a request to establish a session (e.g., a session establishment request) with UE 115 via the wireless communication system, wherein an indication of a traffic flow for the session is provided by the RAN to the UE in response to the session establishment request. In certain examples, aspects of the operations of 1202 may be performed by a determining component as described with reference to FIG. 6 or 7.

At 1204 the UE 115 receives scheduling information for the traffic flow along with the indication, wherein the scheduling information comprises one or more of a time offset information, a reliability, and a minimum throughput delivery of data traffic for the flow. The time offset information may, for example, comprise a pre-determined time offset (e.g., a start time value determined based on a common clock), a delta time offset (e.g., a time offset value relative to one or more existing time offsets of packet arrivals of one or more existing traffic flows), etc. The operations of 1204 may be performed according to the methods described herein. In certain examples, aspects of the operations of 1204 may be performed by a transmitter as described with reference to FIG. 6 or 7.

At 1206 the UE 115 may transmit at least a portion of the scheduling information in response to the indication, to a higher layer. For example, an operating system of UE 115 may transmit the time offset information and/or other portions of the scheduling information to an application on the UE, such as for use in timing transmission of packets of the traffic, flow so as to avoid network congestion. The operations of 1206 may be performed according to the methods described herein. In certain examples, aspects of the operations of 1202 may be performed by a transmitting component as described with reference to FIG. 6 or 7.

Figure 12B:
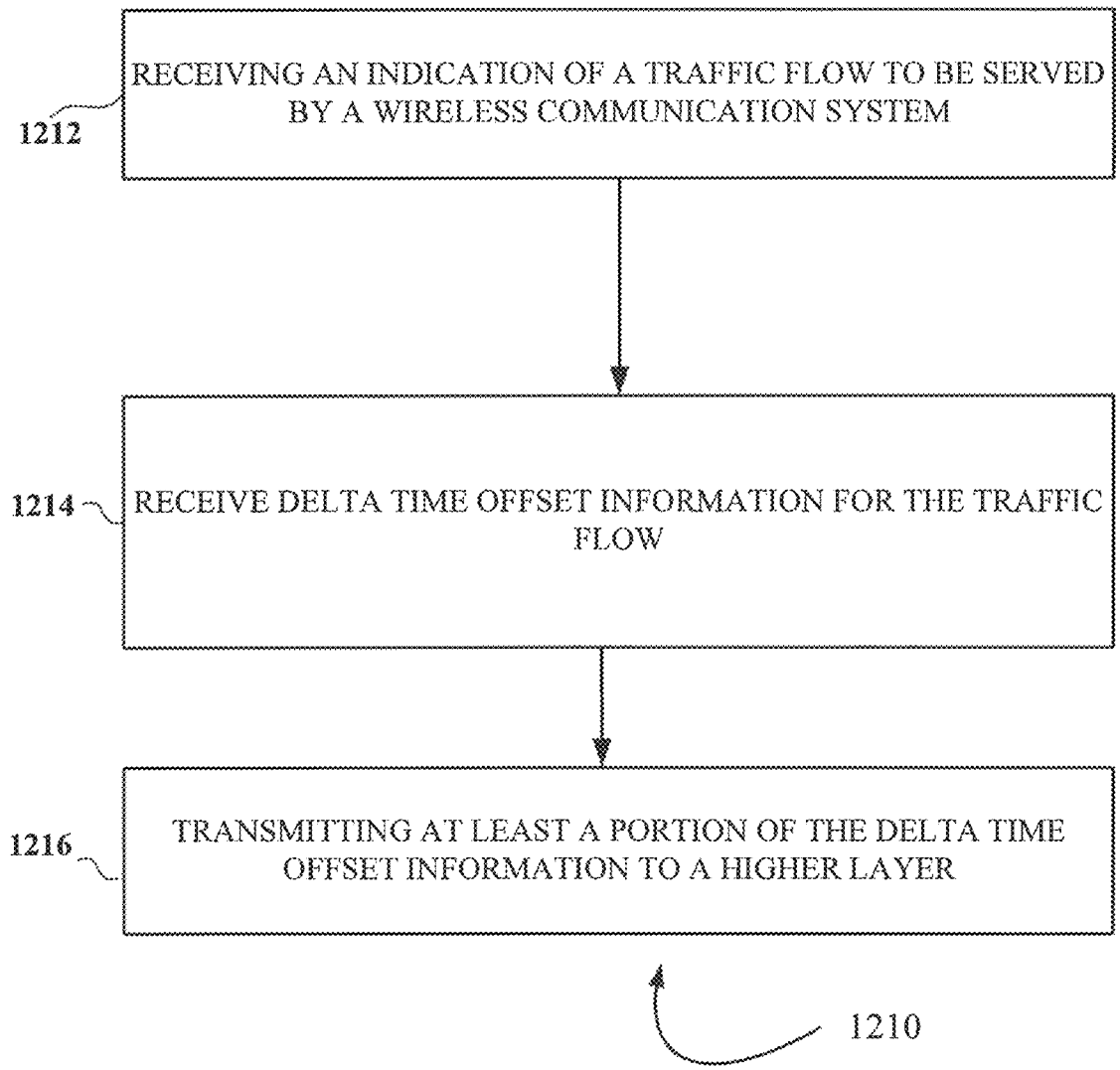

FIG. 12B shows a flowchart illustrating a method 1210 that supports techniques for signaling time offsets in accordance with aspects of the present disclosure. The operations of method 1210 may be implemented by a UE 115 or its components as described herein. For example, the operations of method 1210 may be performed by a UE communications manager as described with reference to FIGS. 6 and 7. In some examples, a UE 115 may execute a set of codes to control the functional elements of the device to perform the functions described below.

At 1212 the UE 115 may receive an indication of a traffic flow to be served by a wireless communication system. The operations of 1212 may be performed according to the methods described herein. For example, an application on the UE may initiate a request via an operating system of UE 115 to establish a session (e.g., a session establishment request) with an AF of an edge server, wherein an indication of a traffic flow for the session is provided by the RAN to the UE in response to the session establishment request. As another example, an AF of an edge server may initiate a request to establish a session (e.g., a session establishment request) with UE 115 via the wireless communication system, wherein an indication of a traffic flow for the session is provided by the RAN to the UE in response to the session establishment request. In certain examples, aspects of the operations of 1212 may be performed by a determining component as described with reference to FIG. 6 or 7.

At 1214 the UE 115 receives delta time offset information for the traffic flow. The delta time offset information may, for example, be received along with the indication, such as where the traffic flow is a new traffic flow being established (e.g., between the LIE and an AF of an edge server via the wireless communication system). As another example, the delta time offset information may be received independent of the indication, such as where the traffic flow is an existing traffic flow previously established (e.g., between the UE and an AF of an edge server via the wireless communication system). The delta time offset information may, for example, comprise a time offset value relative to one or more existing time offsets of packet arrivals of one or more existing traffic flows. The operations of 1214 may be performed according to the methods described herein. In certain examples, aspects of the operations of 1204 may be performed by a transmitter as described with reference to FIG. 6 or 7.

At 1216 the UE 115 may transmit at least a portion of the delta time offset information, to a higher layer. For example, an operating system of UE 115 may transmit a time offset value of the delta time offset information and/or other portions of scheduling information to an application on the UE (e.g., in response to the indication, independent of the indication, etc.), such as for use in timing transmission of packets of the traffic flow so as to avoid network congestion. The operations of 1216 may be performed according to the methods described herein. In certain examples, aspects of the operations of 1202 may be performed by a transmitting component as described with reference to FIG. 6 or 7.

Figure 13A:
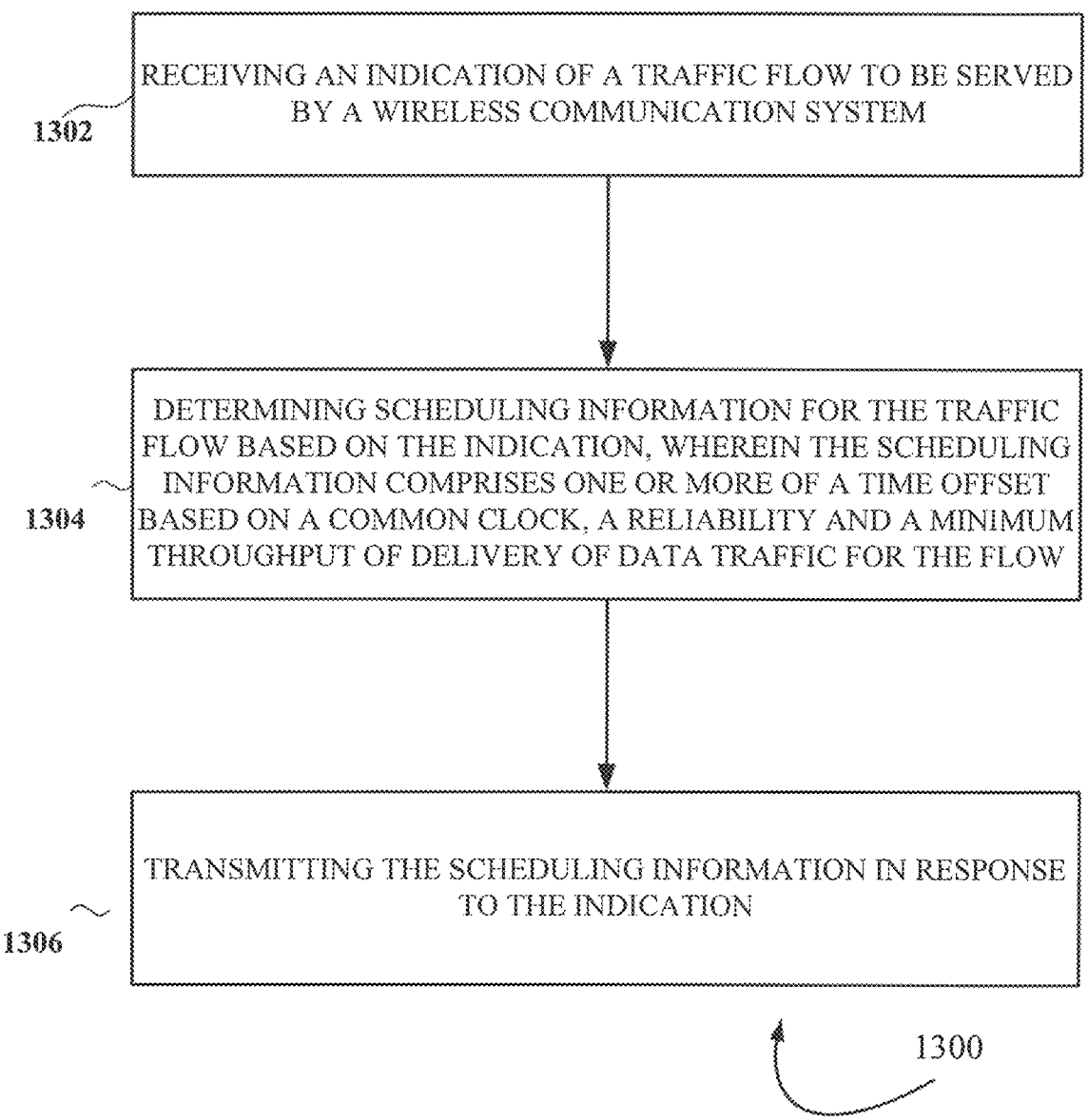
FIGS. 13A-13C illustrate methods at a device for signaling offset in accordance with aspects of the present disclosure.

FIG. 13A shows a flowchart illustrating a method 1300 that supports techniques for signaling time offsets in accordance with aspects of the present disclosure. The operations of method 1300 may be implemented by a RAN device (e.g., a base station, a gNB, a Central Unit (CU), a Distributed Unit (DU), etc.) or its components (e.g., a Session Management Function (SMF), a Policy Control Function (PCF), etc.) as described herein. For example, the operations of method 1300 may be performed by a base station communications manager as described with reference to FIGS. 9 and 10.

At 1302 the RAN device may receive an indication of a traffic flow to be served by a wireless communication system. The operations of 1302 may be performed according to the methods described herein. For example, an AF of an edge server or an application on a UE may initiate a request to establish a session (e.g., a session establishment request) with a corresponding AE, wherein an indication of a traffic flow for the session provided by the RAN in response to the session establishment request is received by the RAN device. As another example, an AF of an edge server or an application on the UE may initiate a request to establish a session (e.g., a session establishment request) with a corresponding AE, wherein the session establishment request may be interpreted as an indication of a traffic flow by the RAN device. In certain examples, aspects of the operations of 1302 may be performed by a receiver as described with reference to FIG. 9 or 10.

At 1304 the RAN device may determine scheduling information for the traffic flow based on the indication, wherein the scheduling information comprises one or more of a time offset information, a reliability, and a minimum throughput of delivery of data traffic for the flow. The time offset information may, for example, comprise a pre-determined time offset (e.g., a start time value determined based on a common clock), a delta time offset (e.g., a time offset value relative to one or more existing time offsets of packet arrivals of one or more existing traffic flows), etc. The operations of 1204 may be performed according to the methods described herein.

At 1306 the RAN device may transmit the scheduling information in response to the indication. For example, the RAN device may transmit the time offset information to an AE (e.g., an AF of an edge server and/or an application on a user device), such as for use in timing communication of packets of the traffic flow to avoid network congestion. In certain examples, aspects of the operations of 1306 may be performed by a transmitter as described with reference to FIG. 9 or 10.

Figure 13B:
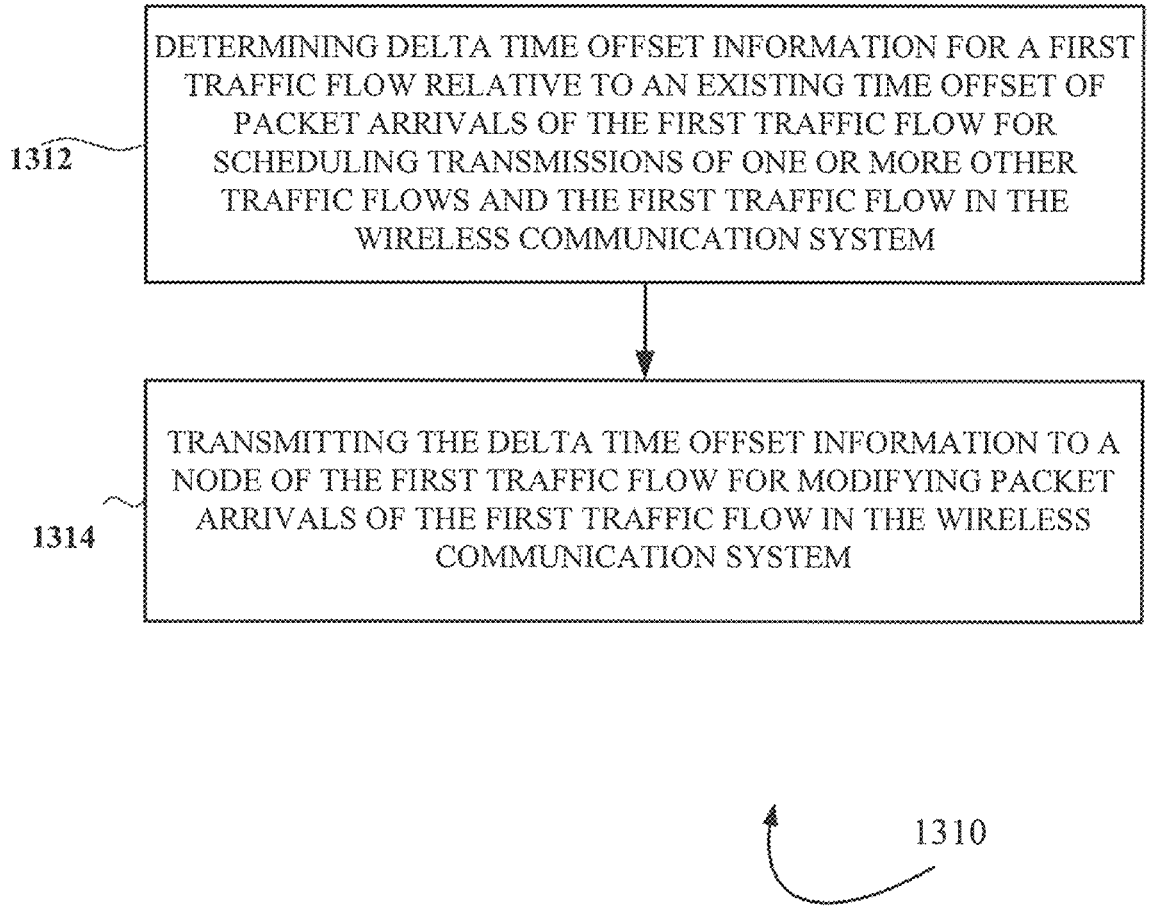

FIG. 13B shows a flowchart illustrating a method 1310 that supports techniques for signaling time offsets in accordance with aspects of the present disclosure. The operations of method 1310 may be implemented by various nodes within the wireless communication system, such as a RAN device (e.g., a base station, a gNB, a Central Unit (CU), a Distributed Unit (DU), etc.), its components (e.g., a Session Management Function (SMF), a Policy Control Function (PCF), etc.), or a component in communication therewith (e.g., a User Plane Function (UPF)) as described herein. For example, the operations of method 1310 may be performed by a base station communications manager as described with reference to FIGS. 9 and 10 and/or a UE communications manager as described with reference to FIGS. 6 and 7.

Figure 14:
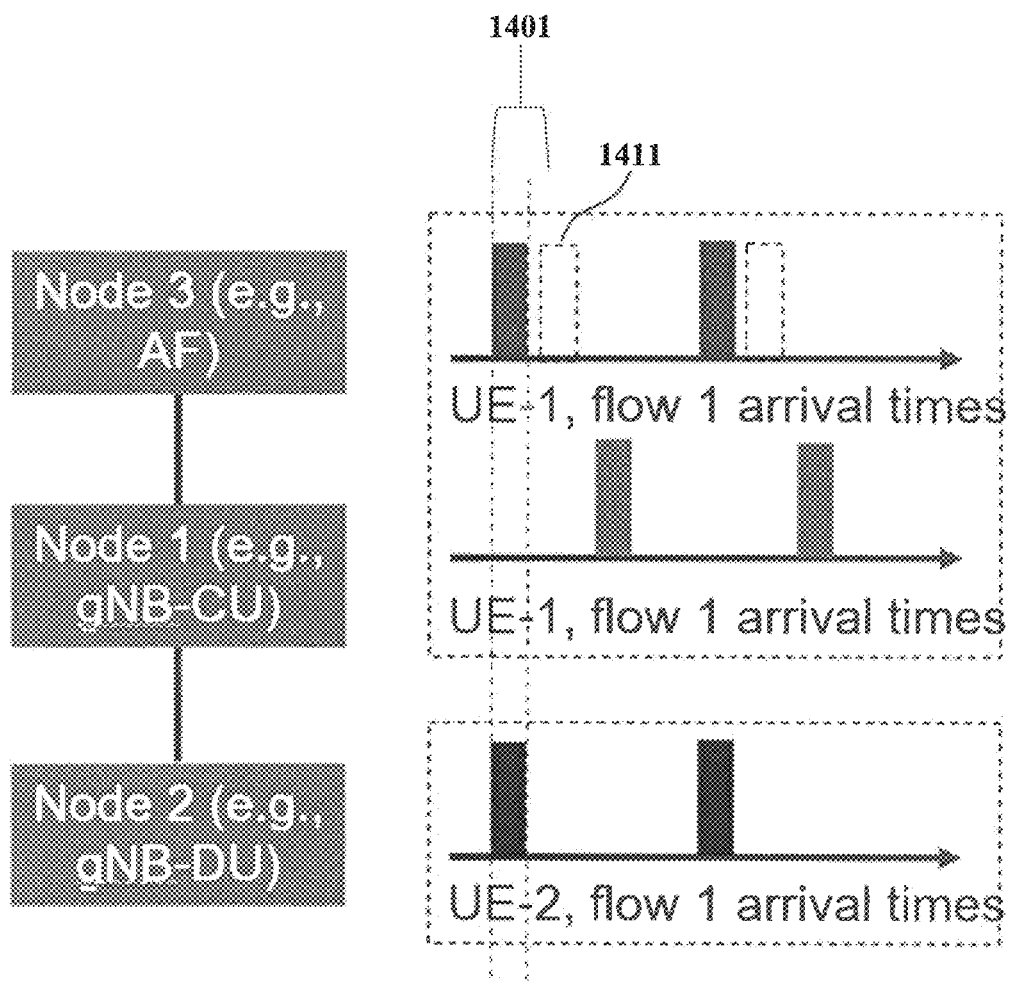
FIG. 14 illustrates packet arrival times of traffic flows within a wireless communication system.

At 1312 delta time offset information is determined for a first traffic flow relative to an existing time offset of packet arrivals of the first traffic flow for scheduling transmissions of one or more other traffic flows and the first traffic flow in the wireless communication system. As shown in the example of FIG. 14, the arrival time of packets of a traffic flow associated with UE-1 and a traffic flow associated with UE-2 may overlap with respect to one or more nodes (e.g., Node 2 and Node 3) of the wireless communication system. Accordingly, delta time offset information comprising a time offset value (e.g., delta time offset 1401 shown in FIG. 14) determined relative to a current packet arrival offset may be determined relative to a time offset of packet arrivals of the first traffic flow. The delta time offset information may, for example, be determined for applying to an pre-determined or existing time offset of the first traffic flow for providing better packet arrival offset (e.g., non-overlapping packet arrival) for the first traffic flow and the one or more other traffic flows. In some examples, determining the delta time offset information maybe be performed by logic (e.g., instructions of software 1130 executed by processor 1120 to provide functionality of BS communications manager 1115 and/or instructions of software 830 executed by processor 820 to provide functionality of UE communications manager 815) of a node (e.g., a RAN device, its components, or a component in communication therewith) of the wireless communication system.

Determining the delta time offset information may be initiated variously with respect to a traffic flow to which it may be applied. For example, delta time offset information may be determined and applied with respect to a new traffic flow. Accordingly, a node operating to determine the delta time offset information may receive an indication of a traffic flow to be served by a wireless communication system (e.g., operation according to block 1302 of FIG. 13A may be performed prior to block 1312 of FIG. 13B). Additionally or alternatively, the occurrence of an event (e.g., network congestion is detected, communication performance degrades below a threshold level, quality of service metrics are not met or at risk of not being met, etc.) may be detected by the node operating to determine the delta time offset information and result in initiation of the determination. In some aspects of the present disclosure, the determining the delta time offset information may be performed in part based on one or more mobility event (e.g., one or more of a mobility event associated with a UE of the first traffic flow, a mobility event associated with a UE of the one or more other traffic flows, a change detected in packet arrival offset of the first traffic flow, or a change detected in packet arrival offset of the one or more other traffic flows).

Figure 13C:
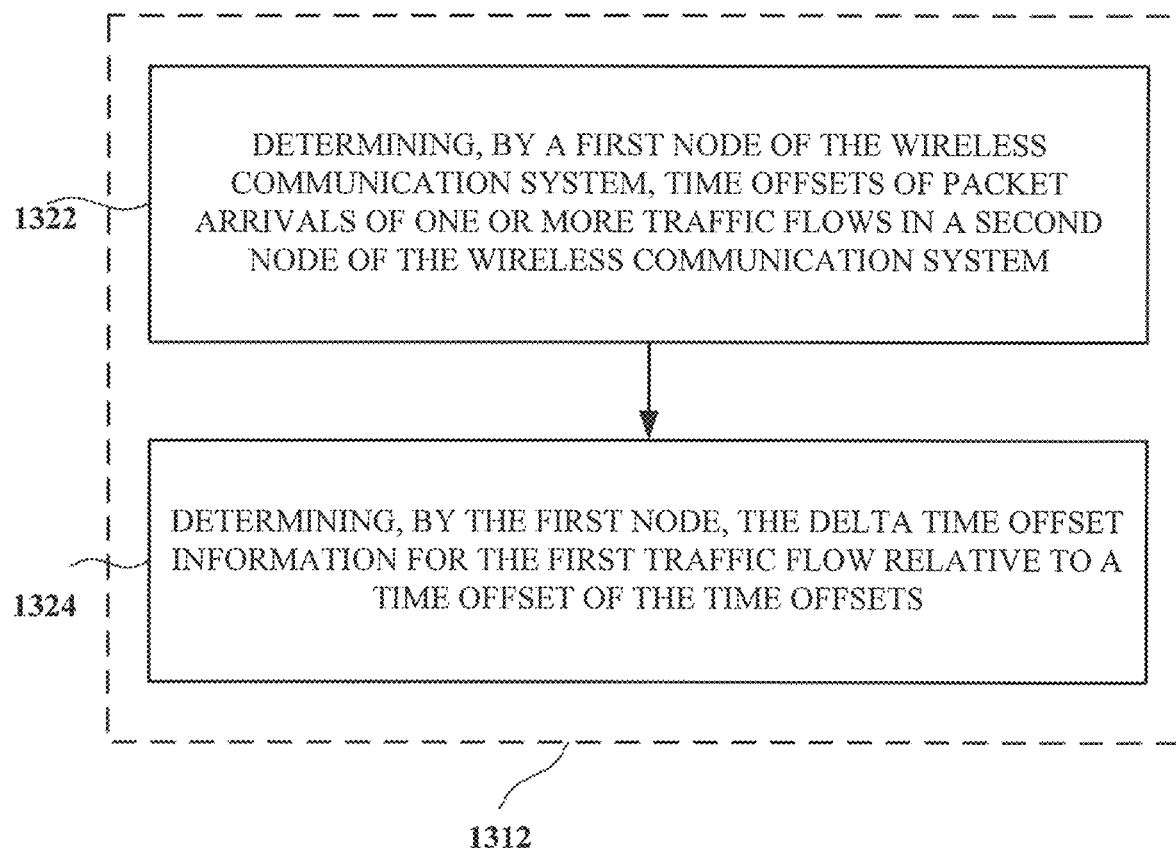

Determining the delta time offset information may comprise various operations and/or determinations. For example, as shown in FIG. 13C, determining the delta time offset information may comprise determining time offsets of packet arrivals of one or more existing traffic flows and/or the first traffic flow, wherein delta time offset information for one or more traffic flows (e.g., the existing one or more traffic flows, a new traffic flow, and/or one or more other existing traffic flows) may be determined relative to a time offset of the time offsets. At 1322 a first node of the wireless communication system determines time offsets of packet arrivals of one or more traffic flows in a second node of the wireless communication system. In examples, a first node (e.g., Node 1 of FIG. 14) may determine the current packet arrival offset for one or more existing traffic flows in a second node (e.g., Node 2 of FIG. 14). A determination with respect to current packet arrival offset may, for example, be based on learning of offsets (after flow establishment), based on traffic pattern information (e.g., TSCAI) provided to the first node (e.g., during flow establishment), etc.

The first node may utilize one or more of the determined current packet arrival offset for the one or more existing traffic flows to determine the delta time offset information (e.g., a time offset value relative to a current packet arrival offset). At 1324 the first node determines the delta time offset information for the first traffic flow relative to a time offset of the time offsets. The delta time offset may, for example, be determined so that the application of the delta time offset eliminates or reduces overlap between packet arrivals of the first traffic flow and the one or more other traffic flows (e.g., as illustrated in the example of FIG. 14). Reduction of such overlaps reduces peak resources required for transmissions to support the packet arrivals and thus enable supporting more UEs with such packet arrivals.

In examples, determining the delta time offset information may provide for determining various desired or preferred characteristics of packet arrival of a new or existing traffic flow. For example, the delta time offset information determined according to some examples may comprise a time offset value determined relative to a current packet arrival offset. Additionally or alternatively, determining the delta time offset information according to some examples may comprise determining a period of packet arrival.

Referring again to FIG. 13B, at 1314 the delta time offset information is transmitted to a node of the first traffic flow for modifying packet arrivals of the first traffic flow in the wireless communication system. For example, the first node (e.g., Node 1 of FIG. 4) may transmit the delta time offset information to a third node (e.g., Node 3 of FIG. 4) for modifying packet arrival characteristics based at least in part on the delta time offset information. In examples, the third node may apply a time offset value relative to a current packet arrival offset (e.g., delta time offset 1401 of FIG. 14) of the delta time offset information with respect to transmission of packets of the first traffic flow to provide offset of packet arrival. As shown in the example of FIG. 14, application of delta time offset 1401 results in a new arrival time of packets of a traffic flow associated with UE-1 (e.g., as shown by arrival time 1411) being non-overlapping with respect to the arrival time of packets of a traffic flow associated with UE-2. In certain examples, aspects of the operations of 1306 may be performed by a transmitter as described with reference to FIG. 9 or 10 and/or a UE communications manager as described with reference to FIGS. 6 and 7.

The traffic flow for which delta time offset information is determined and/or to which delta time offset information is applied may comprise various types of traffic flows. In examples, the traffic flow may comprise a QoS flow, a Data Radio Bearer (DRB) or PDU session associated with a UE, etc. The traffic flow may, for example, comprise a flow between an AF of an edge server and an application on a user device (e.g., traffic originating from and/or destined to the edge server), wherein the third node may comprise an AE (e.g., the AF or the user device application) that modifies the packet arrival characteristics using the delta time offset information. the such as for use in timing communication of packets of the traffic flow to avoid network congestion.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a radio access network (RAN) device, an indication of a first traffic flow for a new flow session between an edge server and a user equipment (UE) via the RAN device;
   and
   transmitting, by the RAN device to the edge sever, time offset information in response to the indication, the time offset information determined prior to establishing the new flow session and based on arrival times of data packets of one or more second traffic flows and without reference to a common clock, the time offset information configured to facilitate non-overlapping data packet arrival within the RAN.

2. The method of claim 1, wherein a time offset value of the time offset information is determined for the one or more second traffic flows prior to establishing the new flow session.

3. The method of claim 1, further comprising the time offset information, wherein determining the time offset information includes determining a plurality of time offset values for scheduling traffic transmission of the first traffic flow, and wherein the transmitting the time offset information comprises transmitting the plurality of time offset values to an application entity in a wireless communication system.

4. The method of claim 1, wherein transmitting the time offset information further comprises signaling the time offset information to at least one application entity in a wireless communication system.

5. The method of claim 4, wherein the at least one application entity includes an Application Function (AF) on the edge server.

6. The method of claim 5, wherein the time offset information comprises a time offset for scheduling traffic originating from or destined to the edge server.

7. The method of claim 5, further comprising transmitting the time offset information between the RAN and the AF in new fields of existing messages, new messages, or in reinterpreted fields of existing messages, wherein the time offset information is transmitted between the AF and a Policy Control Function (PCF), a Session Management Function (SMF) and the PCF, an Access and Mobility Management Function (AMF) and the SMF, or the RAN and the AMF.

8. The method of claim 7, further comprising transmitting the time offset information in a notification message on a 3GPP interface between the AF and the PCF.

9. The method of claim 7, further comprising transmitting the time offset information in a notification message on a 3GPP interface between the RAN and the AMF.

10. The method of claim 4, wherein the at least one application entity includes an application on the UE.

11. The method of claim 10, further comprising transmitting the time offset information to the application on the UE via an operating system on the UE.

12. The method of claim 1, wherein the indication of the first traffic flow was provided to the RAN device by an entity other than the edge server, the UE, and the RAN device.

13. The method of claim 1, further comprising determining, by the RAN device, the time offset information.

14. The method of claim 1, wherein the arrival times of the data packets of the one or more second traffic flows comprise arrival times of the data packets of the one or more second traffic flows between the UE and the edge server.

15. The method of claim 1, further comprising initiating, by the RAN and with the edge server, a negotiation session whereby at least one time offset value of multiple time offset values corresponding to the time offset information is selected.

16. The method of claim 1, wherein the time offset information comprises multiple time offset values, the method further comprising initiating, by the RAN and with the edge server, a negotiation session whereby at least one time offset value of the multiple time offset values is selected.

17. The method of claim 1, wherein the time offset information comprises multiple time offset values.

18. The method of claim 17, further comprising initiating, by the RAN and with the edge server, a negotiation session whereby at least one time offset value of the multiple time offset values is selected.

19. The method of claim 1, wherein the time offset information is encoded by reinterpretation of existing fields in existing messages.

20. The method of claim 1, wherein the time offset information is included in a notification message.

21. An apparatus configured for wireless communication, comprising:
 means for receiving an indication of a new flow session for a first traffic flow between an edge server and a user equipment (UE) via the apparatus;
 means for transmitting, by the apparatus to the edge sever, time offset information in response to the indication, the time offset information determined prior to establishing the new flow session and based on arrival times of data packets of one or more second traffic flows and without reference to a common clock, the time offset information configured to facilitate non-overlapping data packet arrival within a radio access network (RAN).

22. The apparatus claim 21, wherein the a time offset value of the time offset information is determined for the one or more second traffic flows prior to establishing the new flow session.

23. The apparatus of claim 21, further comprising means for determining the time offset information, the means for determining including means for determining a plurality of time offset values for scheduling traffic transmission of the first traffic flow, and wherein the means for transmitting the time offset information comprises transmitting the plurality of time offset values to an application entity in a wireless communication system.

24. The apparatus of claim 21, wherein the means for transmitting the time offset information further comprises means for signaling the time offset information to at least one application entity in a wireless communication system, wherein the at least one application entity includes an Application Function (AF) on the edge server, and wherein the time offset information comprises a time offset for scheduling traffic originating from or destined to the edge server.

25. The apparatus of claim 24, wherein the at least one application entity includes an application on the UE.

26. The apparatus of claim 25, further comprising means for transmitting the time offset information to the application on the UE via an operating system on the UE.

27. The apparatus of claim 21, further comprising means for transmitting the time offset information between the RAN and an Application Function (AF) in new fields of existing messages, new messages, or in reinterpreted fields of existing messages, wherein the time offset information is transmitted between the AF and a Policy Control Function (PCF), a Session Management Function (SMF) and the PCF, an Access and Mobility Management Function (AMF) and the SMF, or the RAN and the AMF.

28. The apparatus of claim 27, further comprising means for transmitting the time offset information in a notification message on a 3GPP interface between the AF and the PCF.

29. The apparatus of claim 27, further comprising means for transmitting the time offset information in a notification message on a 3GPP interface between the RAN and the AMF.

30. A non-transitory computer-readable medium having program code recorded thereon, the program code comprising:
 program code executable by a computer in a radio access network (RAN) device for causing the computer to receive an indication of a first flow session for a traffic flow between an edge server and a user equipment (UE) via the RAN device; and
 program code executable by the computer for causing the computer to transmit, to the edge server, time offset information in response to the indication, the time offset information determined prior to establishing the first flow session and based on arrival times of data packets of one or more second traffic flows and without reference to a common clock, the time offset information configured to facilitate non-overlapping data packet arrival within the RAN.

31. The non-transitory computer-readable medium of claim 30, wherein a time offset value of the time offset information is determined for the one or more second traffic flows prior to establishing the first flow session.

32. The non-transitory computer-readable medium of claim 30, further comprising program code executable by the computer for causing the computer to determine the time offset information, wherein, to determine the time offset information, the program code executable by the computer for causing the computer to determine the time offset information is further executable by the computer for causing the computer to determine a plurality of time offset values for scheduling traffic transmission of the traffic flow, and wherein the program code executable by the computer for causing the computer to transmit the time offset information is further executable by the computer for causing the computer to transmit the plurality of time offset values to an application entity in a wireless communication system.

33. The non-transitory computer-readable medium of claim 30, wherein the program code for causing the computer to transmit the time offset information further comprises program code executable by the computer for causing the computer to signal the time offset information to at least one application entity in a wireless communication system.

34. The non-transitory computer-readable medium of claim 33, wherein the at least one application entity includes an Application Function (AF) on the edge server.

35. The non-transitory computer-readable medium of claim 34, further comprising program code for causing the computer to transmit the time offset information between the RAN and the AF in new fields of existing messages, new messages, or in reinterpreted fields of existing messages, wherein the time offset information is transmitted between the AF and a Policy Control Function (PCF), a Session Management Function (SMF) and the PCF, an Access and Mobility Management Function (AMF) and the SMF, or the RAN and the AMF.

36. The non-transitory computer-readable medium of claim 35, further comprising program code for causing the computer to transmit the time offset information in a notification message on a 3GPP interface between the AF and the PCF.

37. The non-transitory computer-readable medium of claim 35, further comprising program code for causing the computer to transmit the time offset information in a notification message on a 3GPP interface between the RAN and the AMF.

38. The non-transitory computer-readable medium of claim 33, wherein the at least one application entity includes an application on the UE.

39. The non-transitory computer-readable medium of claim 38, further comprising program code for causing the computer to transmit the time offset information to the application on the UE via an operating system on the UE.

40. An apparatus configured for wireless communication, the apparatus comprising:
at least one processor; and
a memory coupled to the at least one processor, wherein the at least one processor is configured to:
receive an indication of a new flow session for a traffic flow between an edge server and a user equipment (UE) via the apparatus;
and
transmit time offset information in response to the indication, the time offset information determined prior to establishing the new flow session and based on arrival times of data packets of one or more second traffic flows and without reference to a common clock, the time offset information configured to facilitate non-overlapping data packet arrival within a radio access network (RAN).

41. The apparatus of claim 40, wherein a time offset value of the time offset information is determined for the one or more second traffic flows prior to establishing the new flow session.

42. The apparatus of claim 40, wherein determination of the time offset information comprises determining a plurality of time offset values for scheduling traffic transmission of the traffic flow, and wherein transmitting the time offset information comprises transmitting the plurality of time offset values to an application entity in a wireless communication system.

43. The apparatus of claim 40, wherein the at least one processor configured to transmit the time offset information is further configured to signal the time offset information to at least one application entity in a wireless communication system.

44. The apparatus of claim 43, wherein the at least one application entity includes an Application Function (AF) on the edge server.

45. The apparatus of claim 44, wherein the time offset information comprises a time offset for scheduling traffic originating from or destined to the edge server.

46. The apparatus of claim 44, wherein the at least one processor is further configured to transmit the time offset information between the RAN and the AF in new fields of existing messages, new messages, or in reinterpreted fields of existing messages, wherein the time offset information is transmitted between the AF and a Policy Control Function (PCF), a Session Management Function (SMF) and the PCF, an Access and Mobility Management Function (AMF) and the SMF, or the RAN and the AMF.

47. The apparatus of claim 46, wherein the at least one processor is further configured to transmit the time offset information in a notification message on a 3GPP interface between the AF and the PCF.

48. The apparatus of claim 46, wherein the at least one processor is further configured to transmit the time offset information in a notification message on a 3GPP interface between the RAN and the AMF.

49. The apparatus of claim 43, wherein the at least one application entity includes an application on the UE.

50. The apparatus of claim 49, wherein the at least one processor is further configured to transmit the time offset information to the application on the UE via an operating system on the UE.

* * * * *